US009487607B2

(12) United States Patent
Sohn et al.

(10) Patent No.: US 9,487,607 B2
(45) Date of Patent: Nov. 8, 2016

(54) CATALYST COMPOSITION FOR PREPARING MULTIMODAL POLYOLEFIN RESIN WITH REMARKABLE MOLDABILITY AND MECHANICAL PROPERTIES, AND POLYMERIZATION METHOD USING SAME

(71) Applicant: DAELIM INDUSTRIAL CO., LTD., Seoul (KR)

(72) Inventors: Byung-Keel Sohn, Daejeon (KR); Seung-Tack Yu, Gyeonggi-do (KR); Sah-Mun Hong, Daejeon (KR); Yong-Jae Jun, Daejeon (KR); Da-Jung Kim, Gyeonggi-do (KR); Yong Kim, Gwangju (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 0 days.

(21) Appl. No.: 14/648,795

(22) PCT Filed: Dec. 3, 2013

(86) PCT No.: PCT/KR2013/011096
§ 371 (c)(1),
(2) Date: Jun. 1, 2015

(87) PCT Pub. No.: WO2014/088287
PCT Pub. Date: Jun. 12, 2014

(65) Prior Publication Data
US 2015/0299352 A1   Oct. 22, 2015

(30) Foreign Application Priority Data
Dec. 3, 2012 (KR) .................. 10-2012-0139149

(51) Int. Cl.
*C08F 4/653* (2006.01)
*C08F 4/6592* (2006.01)
*C08F 210/16* (2006.01)
*C08F 2/00* (2006.01)
*C08F 4/659* (2006.01)

(52) U.S. Cl.
CPC .............. *C08F 210/16* (2013.01); *C08F 2/00* (2013.01); *C08F 4/65912* (2013.01); *C08F 4/65916* (2013.01); *C08F 4/65925* (2013.01); *C08F 4/65927* (2013.01)

(58) Field of Classification Search
CPC ............ C08F 4/65904; C08F 4/65925; C08F 4/65927; C08F 210/00; C08F 210/16
See application file for complete search history.

(56) References Cited

U.S. PATENT DOCUMENTS

| | | | |
|---|---|---|---|
| 4,159,685 A | 7/1979 | Wurst et al. | |
| 4,461,873 A | 7/1984 | Bailey et al. | |
| 4,530,914 A | 7/1985 | Ewen et al. | |
| 4,808,561 A | 2/1989 | Welborn, Jr. | |
| 4,935,474 A | 6/1990 | Ewen et al. | |
| 4,937,299 A | 6/1990 | Ewen et al. | |
| 5,183,867 A | 2/1993 | Welborn, Jr. | |
| 5,266,544 A | 11/1993 | Tsutsui et al. | |
| 5,395,810 A | 3/1995 | Shamshoum et al. | |
| 5,539,076 A | 7/1996 | Nowlin et al. | |
| 5,594,078 A | 1/1997 | Welch et al. | |
| 5,747,405 A | 5/1998 | Little et al. | |
| 8,637,691 B2 * | 1/2014 | Yang ....................... | C07F 17/00 556/51 |
| 2007/0197374 A1 * | 8/2007 | Yang ....................... | C08F 10/00 502/103 |

FOREIGN PATENT DOCUMENTS

| | | |
|---|---|---|
| EP | 0 676 418 A1 | 10/1995 |
| EP | 0 705 848 A2 | 4/1996 |
| EP | 0 707 402 A2 | 4/1996 |
| EP | 0 717 755 B1 | 2/1999 |
| EP | 2 102 282 B1 | 2/2011 |
| KR | 10-2008-0050428 A | 6/2008 |
| KR | 10-2008-0104331 A | 12/2008 |
| KR | 10-2010-0086863 A | 8/2010 |
| WO | WO 99/32531 * | 7/1999 ............. C08F 10/02 |

OTHER PUBLICATIONS

Written Opinion of the International Searching Authority dated Mar. 11, 2014 issued in corresponding International Application No. PCT/KR2013/011096.

* cited by examiner

*Primary Examiner* — Caixia Lu
(74) *Attorney, Agent, or Firm* — Nath, Goldberg & Meyer; Joshua B. Goldberg; Tanya E. Harkins

(57) ABSTRACT

A metallocene catalyst composition for preparing multimodal polyolefin resin which has superior moldability, mechanical strength, appearance and so on, and a polymerization method using the same are disclosed. The catalyst composition comprises (i) at least one first metallocene compound represented by Formula 1 in the description part: (ii) at least one second metallocene compound represented by Formula 2 in the description of the Specification: and a co-catalyst.

13 Claims, 8 Drawing Sheets

CATALYST COMPOSITION FOR PREPARING MULTIMODAL POLYOLEFIN RESIN WITH REMARKABLE MOLDABILITY AND MECHANICAL PROPERTIES, AND POLYMERIZATION METHOD USING SAME

TECHNICAL FIELD

This invention relates to a catalyst composition for preparing polyolefin resin and method of polymerization using the same, and more particularly, to a metallocene catalyst composition for preparing multimodal polyolefin having characteristics such as superior moldability, mechanical strength and appearance, and so on and method of polymerization using the same.

BACKGROUND ART

Polyolefin having multimodal molecular weight distribution has at least two components each having different molecular weight. For example, polyolefin contains a high molecular weight component and a low molecular weight component in relatively proper proportions. Many studies have been conducted for the preparation of a polyolefin having broad molecular weight distribution or multimodal molecular weight distribution. One method among them is a post-reactor process or a melting blending process in which polyolefin having at least two different molecular weights are blended before or during the processing of the polyolefin. For example, U.S. Pat. No. 4,461,873 discloses a blending method of physically blending two different kinds of polymers for preparing a bimodal polymer blend. When such a physical blending method is used, it is liable to produce a molded form having high gel component, a product appearance is deteriorated owing to the gel component, and thus the polyolefin cannot be used for the films. Further, the physical blending method requires a complete uniformity, so there is a disadvantage of the preparing cost being increased.

Another method for preparing polyolefin having multimodal molecular weight distribution, for example bimodal molecular weight distribution is to use a multistage reactor which includes two or more reactors. In the multistage reactor, a first polymer component having one molecular weight distribution among two different molecular weight distribution of the bimodal polymer, is prepared in a certain condition at a first reactor, the first polymer component prepared is transferred to a second reactor, and then a second polymer component having different molecular weight distribution from that of the first polymer component, is prepared in a different condition from that of the first reactor, at the second reactor. The above-mentioned method solves the problems relating to the gel component, but it uses the multistage reactor, so the production efficiency may be decreased or the production cost may be increased. Also, when the high molecular weight components are prepared in the first reactor, the low molecular weight components are not prepared in the second reactor and thus the finally manufactured polyolefin particles may be made only by the high molecular weight components.

Still another method for preparing polyolefin having broad molecular weight distribution or multimodal molecular weight distribution is to polymerize the polyolefin by using a mixture of catalysts in a single reactor. Recently, in the pertinent art, the various attempts have been made for producing polyolefin having broad molecular weight distribution or multimodal molecular weight distribution, by using two or more different catalysts in a single reactor. In this method, the resin particles are uniformly mixed in a level of sub-particles, thus the resin components each having different molecular weight distribution exists in a single phase. For example, U.S. Pat. Nos. 4,530,914 and 4,935,474 disclose a method for preparing polyolefin having broad molecular weight distribution by polymerizing ethylene or more higher alpha-olefins in the presence of a catalyst system comprising two or more metallocenes each having different propagation and termination rate constants and alumoxane. Further, U.S. Pat. Nos. 6,841,631 and 6,894,128 disclose a method for preparing polyethylene having bimodal or multimodal molecular weight distribution by using a metallocene-type catalyst comprising at least two metal compounds and the usage of the polyethylene for manufacturing films, pipes, hollow molded articles and so on. Polyethylene produced in this way has a good processability, but the dispersed state of the polyethylene component in the molecular weight per unit particle is not uniform, so there are disadvantages of rough appearance and unstable physical properties even in relatively good processing conditions.

U.S. Pat. No. 4,937,299 discloses a method for preparing polyolefin by using a catalyst system comprising at least two kinds of metallocenes each having different reactivity ratio with respect to monomer to be polymerized. U.S. Pat. No. 4,808,561 discloses a method for preparing olefin polymerization supported catalyst by reacting metallocene with alumoxane in the presence of a carrier. The metallocene is supported in the carrier to form solid power catalyst. As the carrier, inorganic oxide materials such as silica, alumina, silica-alumina, magnesia, titania, zirconia and the mixture thereof, and resinous materials such as polyolefin (for example, finely divided polyethylene) can be employed, and the metallocenes and alumoxanes are deposited on the dehydrated carrier material.

U.S. Pat. No. 5,539,076 discloses a mixture catalyst system of metallocene/non-metallocene for preparing a specific bimodal high-density copolymer. The catalyst system is supported by an inorganic carrier. The carrier such as silica, alumina, magnesium-chloride and the mixture catalyst of Zeigier-Natta and metallocene are disclosed in U.S. Pat. No. 5,183,867, European publication No. 0676418A1, European Patent No. 0717755B1, U.S. Pat. No. 5,747,405, European publication No. 0705848A2, U.S. Pat. No. 4,659,685, U.S. Pat. No. 5,395,810, European publication No 0747402A1, U.S. Pat. No. 5,266,544 and WO 9613532A1 etc. The mixture catalyst of Zeigier-Natta and metallocene supported has relatively low activity than single uniform catalyst, so it is difficult to prepare polyolefin having properties suitable for a specific use. In addition, since polyolefin is prepared in a single reactor, the gel which is generated in the blending method may be produced, it is difficult to insert comonomer to high molecular weight components part, the form of polymer produced may be poor and further two polymer components may not be uniformly mixed, so the quality control of the produced polyolefin may be difficult.

Korean Patent No. 1132180 discloses a more than one metallocene mixture catalyst system for preparing a multimodal polyolefin copolymer. The catalyst system has a disadvantage that an amount of comonomer of low molecular weight portion of bimodal polymer is not low. In order to satisfy the mechanical strength of polymer and long-term water resistance characteristic as a pipe, the low molecular weight portion should be low the amount of the comonomer, and the high molecular weight portion should be high the amount of the comonomer. However, in the catalyst system, the amount of comonomer of the high molecular weight portion is high, but long-term water resistance characteristic may be reduced due to the comonomer included in the low molecular weight portion. Also, in the catalyst system, since a first metallocene for preparing the low molecular weight polymer has a low hydrogen reactivity, a control of the molecular weight with maintaining appropriate bimodal may difficult, and since molecular weight of two metallocene compounds is too high, melt flow index (MIE, 2.16 kg/10 mins) is too low, and since melt flow index ratio is too broad, mechanical properties of molded form is lowered.

U.S. Pat. No. 5,594,078 discloses a catalyst composition consisting of bridged fluorenyl-containing metallocene, non-bridged metallocene and co-catalyst, and method for producing olefin polymer by using the catalyst composition. However, the U.S. Pat. No. 5,594,078 only discloses simple information such as melt flow index, molecular weight distribution of the polymer obtained by batch-type polymerization, but physical properties of polyolefin such as a moldability, mechanical properties, an appearance of the molded form, which are required industrially, are not taken into account. Also, U.S. Pat. No. 7,619,047 discloses at least two metallocene mixture catalyst system for preparing a multimodal copolymer. The first metallocene used in the mixture catalyst system of U.S. Pat. No. 7,619,047 includes a linear alkenyl group as a substituent in bridged cyclopentadienyl groups, which is different from the bridged fluorenyl-containing metallocene disclosed in U.S. Pat. No. 5,594,078. However, the U.S. Pat. No. 7,619,047 only discloses a melt flow index and molecular weight of the prepared polyolefin, physical properties of polyolefin such as a moldability, mechanical properties, an appearance of the molded form which are required industrially are not taken into account.

DISCLOSURE

Technical Problem

Therefore, it is an object of the present invention to provide a catalyst composition for preparing a multimodal polyolefin resin having molecular weights, molecular weight distribution and shear response (SR) which are suitable for the molding.

It is another object of the present invention to provide a catalyst composition for preparing a polyolefin resin in which comonomer amount in a component of high molecular weight is high and comonomer amount in a component of low molecular weight is very low so that cross-linking of the polyolefin is little and the rigidity of the molded product is high.

It is still another object of the present invention to provide a catalyst composition for preparing a polyolefin resin which is especially useful for molding a pipe with excellent pressure endurances.

It is still another object of the present invention to provide a method for polymerizing a multimodal polyolefin resin in which extrusion load is relatively low and extrusion amount is relatively high in a molding process so that productivity of molded product is superior.

It is still another object of the present invention to a method for polymerizing a multimodal polyolefin resin by which a molded product having excellent appearance and mechanical strength can be formed.

Technical Solution

In order to achieve these objects, the present invention provides a catalyst composition for preparing a multimodal polyolefin resin, comprising (i) at least one first metallocene compound represented by following Formula 1; (ii) at least one second metallocene compound represented by following Formula 2; and (iii) at least one co-catalyst selected from aluminoxane groups represented by following Formulas 3, 4 and 5.

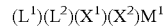  [Formula 1]

In Formula 1, $M^1$ is titanium (Ti), zirconium (Zr) or hafnium (Hf); ($L^1$) and ($L^2$) are independently, a cyclopentadienyl group having a hydrocarbonyl substituent group of 3 to 10 carbon atoms in which at least one secondary or tertiary carbon is contained; ($X^1$) and ($X^2$) are independently F, Cl, Br, I or a hydrocarbonyl group of 1 to 10 carbon atoms.

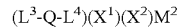  [Formula 2]

In Formula 2, $M^2$ is Ti, Zr or Hf; ($L^3$) is a fluorenyl group having two hydrocarbonyl substituent groups of 4 to 10 carbon atoms in which tertiary carbon is contained; ($L^4$) is a cyclopentadienyl group having at least one hydrocarbonyl substituent group of 4 to 10 carbon atoms; (Q) is a cross-linking functional group represented by Formula $Q^1R^1R^2$, $Q^1$ is carbon atom (C), silicon atom (Si) or germanium atom (Ge), $R^1$ and $R^2$ are independently hydrogen or hydrocarbonyl group of 1 to 10 carbon atoms; ($X^1$) and ($X^2$) are independently F, Cl, Br, I or hydrocarbonyl group of 1 to 10 carbon atoms.

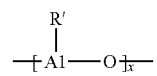 [Formula 3]

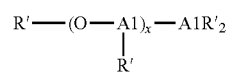 [Formula 4]

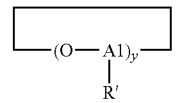 [Formula 5]

In Formulas 3, 4 and 5, R' is a hydrocarbon group, x is an integer of 1 to 70 and y is an integer of 3 to 50.

Further, the present invention provides a method for polymerizing polyolefin using the present catalyst composition, a polyolefin copolymer prepared by the present polymerizing method and a molded product containing the polyolefin copolymer.

Effect of Invention

Molded product of polyolefin resin having good moldability, mechanical strength and external appearance can be produced from the multimodal polyolefin resin prepared by using the catalyst composition according to the present invention.

DETAILED DESCRIPTION OF THE INVENTION

Figure 1:
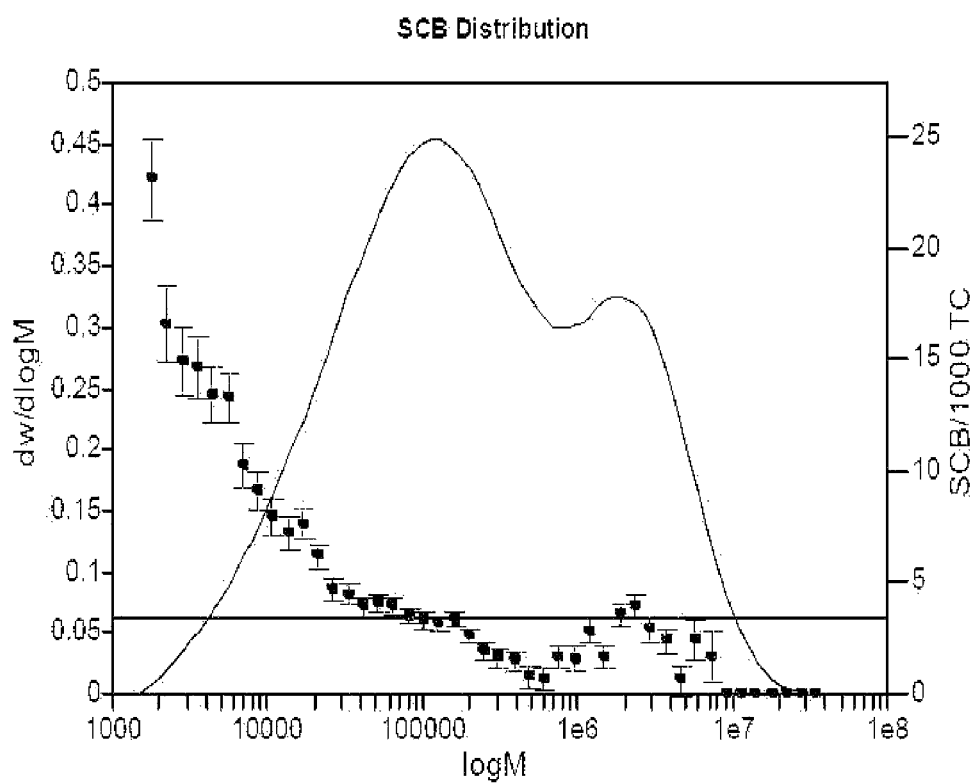
FIG. 1 and FIG. 2 show graphs illustrating comonomer distributions of the copolymers obtained by the Comparative Examples 7 and 8, which are obtained by GPC-IR (Gel Permeation Chromatography Infrared) analysis.

A more detailed description of the invention will be made by reference to the attached drawings. In the following description, if necessary, the polyolefin resin may be called as simply polymer or polyolefin, or ethylene-based polymer, polymer, olefin polymer etc.

The present catalyst for preparing the multimodal polyolefin is for polymerizing multimodal polyolefin used for molding films, pipes and so on, specifically polyolefin having wide molecular weight distribution or bimodal molecular weight distribution. The catalyst composition of the present invention comprises (i) at least one first metallocene compound represented by following Formula 1, for preparing polymer of relatively low molecular weight; (ii) at least one second metallocene compound represented by following Formula 2, for preparing polymer of relatively high molecular weight; and (iii) at least one co-catalyst selected from aluminoxane groups represented by following Formulas 3, 4 and 5.

$(L^1)(L^2)(X^1)(X^2)M^1$      [Formula 1]

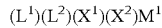

In Formula 1, $M^1$ is titanium (Ti), zirconium (Zr) or hafnium (Hf); ($L^1$) and ($L^2$) are independently, a hydrocarbonyl group of 3 to 10 carbon atoms in which at least one secondary or tertiary carbon is contained, preferably a cyclopentadienyl group having alkyl group of 3 to 7 carbon atoms; ($X^1$) and ($X^2$) are independently F, Cl, Br, I or a hydrocarbonyl group of 1 to 10 carbon atoms, preferably 1 to 6 carbon atoms. Here, ($L^1$) and ($L^2$) each is different to each other, and may be a cyclopentadienyl group having a hydrocarbonyl group of 3 to 10 carbon atoms (preferably, alkyl group of 3 to 7 carbon atoms), which contains at least one secondary or tertiary carbon, but does not contain aryl group. ($L^1$) and ($L^2$) are the same, and may be a cyclopentadienyl group having a hydrocarbonyl group of 3 to 10 carbon atoms (preferably, alkyl group of 3 to 7 carbon atoms, which contains at least one secondary or tertiary carbon, but does not contain aryl group. The secondary or tertiary carbon contained in the hydrocarbonyl group is a part for showing steric hindrance. As required, the cyclopentadienyl group may be substituted by 1 to 4 hydrocarbonyl groups (substituent) of 1 to 10 carbon atoms, besides a substituent group showing the steric hindrance. The adjoining substituent groups are connected to each other to form a ring structure. For example, two hydrocarbonyl groups which are substituted in the cyclopentadienyl group are connected to each other to in whole form an indenyl group (See: following Formula 1h) or form a cyclohexane ring structure (See: following Formula 1i).

$(L^3\text{-}Q\text{-}L^4)(X^1)(X^2)M^2$      [Formula 2]

In Formula 2, $M^2$ is titanium (Ti), zirconium (Zr) or hafnium (Hf); ($L^3$) is a fluorenyl group having preferably two hydrocarbonyl substituent groups of 4 to 10 carbon atoms containing the tertiary carbon (for example alkyl group of 4 to 7 carbon atoms); ($L^4$) is a cyclopentadienyl group having at least one hydrocarbonyl group of 4 to 10 carbon atoms (for example, alkyl group of 4 to 7 carbon atoms), preferably a cyclopentadienyl group which does not contain aryl group and has at least one hydrocarbonyl substituent groups of 4 to 10 carbon atoms, more preferably a cyclopentadienyl group which does not contain aryl group and has one hydrocarbonyl substituent of 4 to 7 carbon atoms (for example, alkyl group); (Q) is a crosslinking functional group represented by Formula $Q^1R^1R^2$, $Q^1$ is carbon atom (C), silicon atom (Si) or germanium atom (Ge), $R^1$ and $R^2$ are independently hydrogen atom or hydrocarbonyl group of 1 to 10 carbon atoms, for example, alkyl group or aryl group of 1 to 7 carbon atoms, preferably $R^1$ and $R^2$ are the same to each other, and aryl group of 6 to 10 carbon atoms; ($X^1$) and ($X^2$) are independently F, Cl, Br, I or hydrocarbonyl group of 1 to 10 carbon atoms. Here, the tertiary carbon contained in the hydrocarbonyl group is a part for showing the steric hindrance. In the present specification, examples of the hydrocarbonyl substituent group not containing aryl group include alkyl group, alkenyl group, alkynyl group, cycloalkyl group and so on.

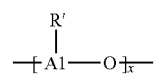    [Formula 3]

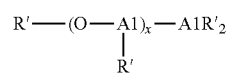    [Formula 4]

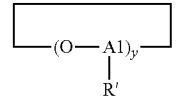    [Formula 5]

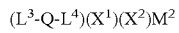

In Formulas 3, 4 and 5, R' is a hydrocarbonyl group, preferably linear or branched alkyl group of 1 to 10 carbon atoms, and it is more preferably that most of R' is methyl group. x is an integer of 1 to 70, preferably 1 to 50, more preferably 10 to 40. y is an integer of 3 to 50, preferably 10 to 40.

In the catalyst composition for polymerizing olefin according to the present invention, (i) the first metallocene compound has a substituent containing the secondary and tertiary carbon which show steric hindrance, and is a catalyst for forming low molecular weight polyolefin which is not branched, and (ii) the second metallocene compound has superior polymerization activity, contains cyclopentadienyl group having a hydrocarbonyl group of 4 to 10 carbon atoms which is effective in reducing LCB (Long Chain Branch) and bridged fluorenyl group, and is a catalyst for forming high molecular weight polyolefin.

Hereinafter, the first metallocene compound represented by the formula 1 will be detail explained. Polymerization of multimodal or bimodal polyolefin requires a catalyst for preparing polymer of relatively low molecular weight and thus for this, the first metallocene compound is employed as the catalyst. When the density of polymer of relatively low molecular weight polymerized with the first metallocene compound is higher, that is, the amount of comonomer in the polymer is less, an extrusion load during the molding of the polymer is reduced and the extrusion amount of the polymer is increased. Accordingly the production yield is superior and when the polymer is molded into a pipe shape, the impact strength and long-term water pressure endurance of the pipe are improved. The first metallocene compound includes ligand (ligand showing steric hindrance effect) having a hydrocarbonyl substituent group in which at least one secondary or tertiary carbon is contained. In case of contacting with comonomer, the coordination of the comonomer to the central metal is suppressed through a steric hindrance so that the density of polymer of relatively low molecular weight is increased. The preferable example of the first metallocene compound represented by Formula 1 include compounds represented by following Formula 1a to Formula 1l.

[Formula 1a]

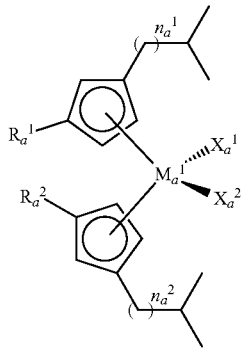

In Formula 1a, $M_a^1$ is Ti, Zr or Hf, $R_a^1$ and $R_a^2$ are independently hydrogen atom or a hydrocarbonyl group of 1 to 10 carbon atoms, $X_a^1$ and $X_a^2$ are independently F, Cl, Br, I or a hydrocarbonyl group of 1 to 10 carbon atoms, $n_a^1$ and $n_a^2$ are independently an integer of 0 to 7.

[Formula 1b]

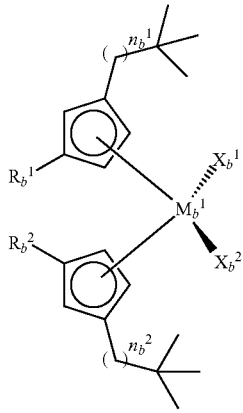

In Formula 1b, $M_b^1$ is Ti, Zr or Hf, $R_b^1$ and $R_b^2$ are independently hydrogen atom or a hydrocarbonyl group of 1 to 10 carbon atoms, $X_b^1$ and $X_b^2$ are independently F, Cl, Br, I or a hydrocarbonyl group of 1 to 10 carbon atoms and $n_b^1$ and $n_b^2$ are independently an integer of 0 to 6.

[Formula 1c]

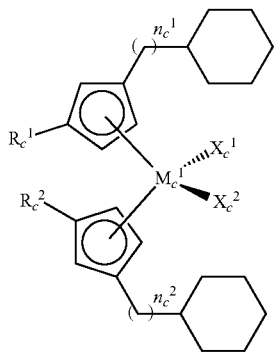

In Formula 1c, $M_c^1$ is Ti, Zr or Hf, $R_c^1$ and $R_c^2$ are independently hydrogen atom or a hydrocarbonyl group of 1 to 10 carbon atoms, $X_c^1$ and $X_c^2$ are independently F, Cl, Br, I or a hydrocarbonyl group of 1 to 10 carbon atoms, $n_c^1$ and $n_c^2$ are independently an integer of 0 to 4.

[Formula 1d]

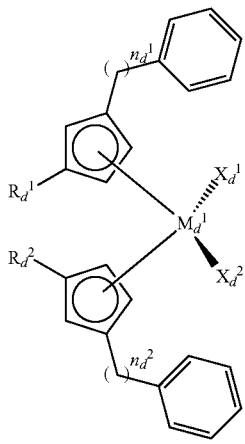

In Formula 1d, $M_d^1$ is Ti, Zr or Hf, $R_d^1$ and $R_d^2$ are dependently hydrogen atom or a hydrocarbonyl group of 1 to 10 carbon atoms, $X_d^1$ and $X_d^2$ are independently F, Cl, Br, I or a hydrocarbonyl group of 1 to 10 carbon atoms, $n_d^1$ and $n_d^2$ are independently an integer of 0 to 4.

[Formula 1e]

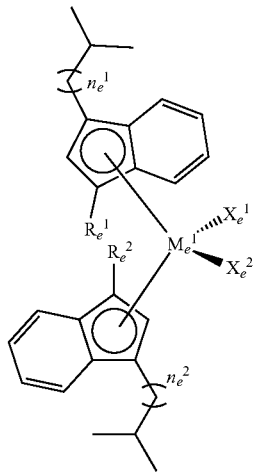

In Formula 1e, $M_e^1$ is Ti, Zr or Hf, $R_e^1$ and $R_e^2$ are independently hydrogen atom or a hydrocarbonyl group of 1 to 10 carbon atoms, $X_e^1$ and $X_e^2$ are independently F, Cl, Br, I or a hydrocarbonyl group of 1 to 10 carbon atoms, $n_e^1$ and $n_e^2$ are independently an integer of 0 to 7.

[Formula 1f]

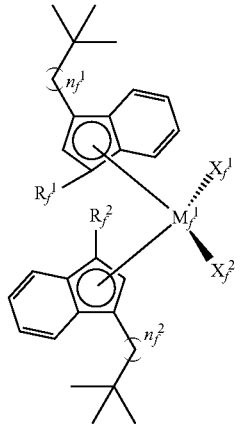

In Formula 1e, $M_f^1$ is Ti, Zr or Hf, $R_f^1$ and $R_f^2$ are independently hydrogen atom or a hydrocarbonyl group of 1 to 10 carbon atoms, $X_f^1$ and $X_f^2$ are independently F, Cl, Br, I or a hydrocarbonyl group of 1 to 10 carbon atoms, $n_f^1$ and $n_f^2$ are independently an integer of 0 to 6.

[Formula 1g]

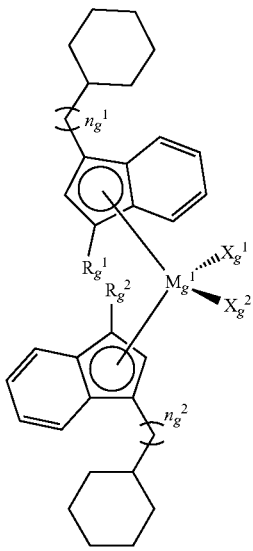

In Formula 1g, $M_g^1$ is Ti, Zr or Hf, $R_g^1$ and $R_g^2$ are independently hydrogen atom or a hydrocarbonyl group of 1 to 10 carbon atoms, $X_g^1$ and $X_g^2$ are independently F, Cl, Br, I or a hydrocarbonyl group of 1 to 10 carbon atoms, $n_g^1$ and $n_g^2$ are independently an integer of 0 to 4.

[Formula 1h]

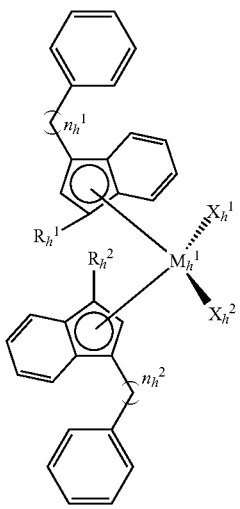

In Formula 1h, $M_h^1$ is Ti, Zr or Hf, $R_h^1$ and $R_h^2$ are independently hydrogen atom or a hydrocarbonyl group of 1 to 10 carbon atoms, $X_h^1$ and $X_h^2$ are independently F, Cl, Br, I or a hydrocarbonyl group of 1 to 10 carbon atoms, $n_h^1$ and $n_h^2$ are independently an integer of 0 to 4.

[Formula 1i]

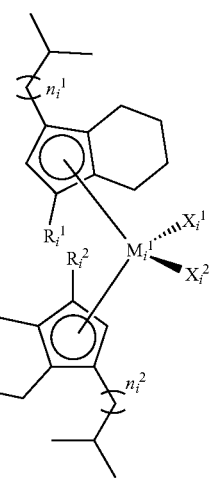

In Formula 1i, $M_i^1$ is Ti, Zr or Hf, $R_i^1$ and $R_i^2$ are independently hydrogen atom or a hydrocarbonyl group of 1 to 10 carbon atoms, $X_i^1$ and $X_i^2$ independently hydrogen atom or a hydrocarbonyl group of 1 to 10 carbon atoms, F, Cl, Br, I or a hydrocarbonyl group of 1 to 10 carbon atoms, $n_i^1$ and $n_i^2$ are independently an integer of 0 to 7.

[Formula 1j]

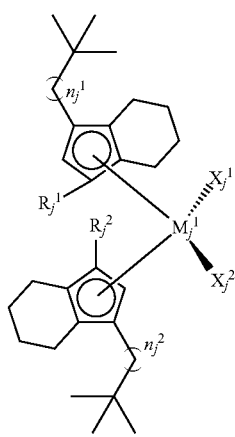

In Formula 1j, $M_j^1$ is Ti, Zr or Hf, $R_j^1$ and $R_j^2$ are independently hydrogen atom or a hydrocarbonyl group of 1 to 10 carbon atoms, $X_j^1$ and $X_j^2$ are independently F, Cl, Br, I or a hydrocarbonyl group of 1 to 10 carbon atoms, $n_j^1$ and $n_j^2$ are independently an integer of 0 to 6.

[Formula 1k]

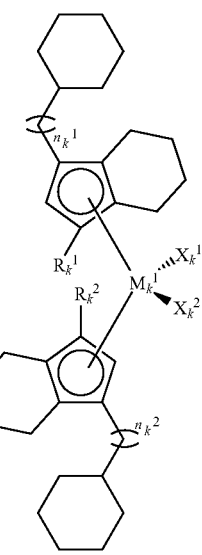

In Formula 1k, $M_k^1$ is Ti, Zr or Hf, $R_k^1$ and $R_k^2$ are independently hydrogen atom or a hydrocarbonyl group of 1 to 10 carbon atoms, $X_k^1$ and $X_k^2$ are independently F, Cl, Br, I or a hydrocarbonyl group of 1 to 10 carbon atoms, $n_k^1$ and $n_k^2$ are independently an integer of 0 to 4.

[Formula 1l]

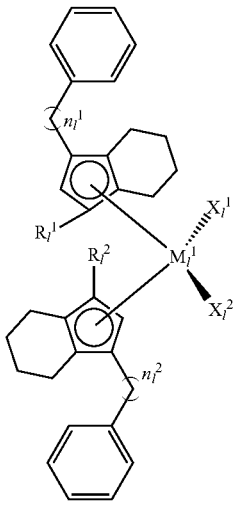

In Formula 1l, $M_l^1$ is Ti, Zr or Hf, $R_l^1$ and $R_l^2$ are independently hydrogen atom or a hydrocarbonyl group of 1 to 10 carbon atoms, $X_l^1$ and $X_l^2$ are independently F, Cl, Br, I or a hydrocarbonyl group of 1 to 10 carbon atoms, $n_l^1$ and $n_l^2$ are independently an integer of 0 to 4.

The more preferable examples of the first metallocene compound represented by Formula 1 include the compound represented by Formula 1m or Formula 1m.

[Formula 1m]

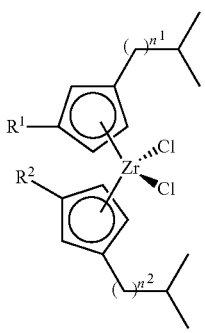

In Formula 1m, $R^1$ and $R^2$ are independently hydrogen atom or methyl group, $n^1$ and $n^2$ are independently an integer of 1 to 3.

[Formula 1n]

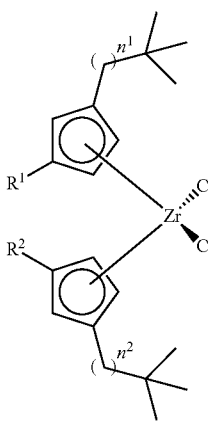

In Formula 1n, $R^1$ and $R^2$ are independently hydrogen atom or methyl group, $n^1$ and $n^2$ are independently an integer of 1 to 3.

The second metallocene compound represented by the formula 2 will be detail explained. Polymerization of multimodal or bimodal polyolefin requires a catalyst for preparing polymer of relatively high molecular weight and for this, the second metallocene compound is employed as such a catalyst. When the density of polymer of relatively high molecular weight polymerized with the second metallocene compound is lowered, that is, the amount of comonomer in the polymer is higher, the impact strength and the long-term water pressure endurance of the molded product are improved, because of the entanglements of SCBs (Short Chain Branch). On the other hand, when LCB (Long Chain Branch) degree in the molecular chains of the high molecular weight polymer (a region) is increased, flexible portion is irregularly generated at inside of chain, so that long-term water pressure endurance of the molded product is decreased. The second metallocene compound comprises (i) a fluorenyl group having at least two hydrocarbonyl groups of 4 to 10 carbon atoms in which the tertiary carbon is contained, and (ii) a cyclopentadienyl group having at least one hydrocarbonyl group of 4 to 10 carbon atoms, wherein two kinds of ligands are bridged so that in case of contacting with comonomer during the polyolefin polymerization, the coordination of LCB having large molecular chain to the central metal is suppressed through a steric hindrance. Accordingly, the introduction of LCB is suppressed in the high molecular weight region of the polymer and the amount of SCB is increased. In detail, control for the activity and molecular weight of the polymer may be made depending on the substituent groups bonded to cyclopentadienyl group of the second metallocene compound, and the compound having a hydrocarbonyl group of at least 4 carbon atoms is combined effectively with the first metallocene compound (See: following Examples). In more detail, since ligands are bridged, even though the substituent group representing a steric hindrance effect is contained in fluorenyl group, the reaction space of monomer becomes wide and thus the LCB introduction is not completely blocked. Therefore, in order to further suppress the LCB introduction, the cyclopentadienyl group of the second metallocene compound includes a hydrocarbonyl group of at least 4 carbon atoms. Since the second metallocene compound represented by Formula 2 contains ligands showing steric hindrance effect so that the LCB introduction in the polyolefin molecular chain is suppressed, but the introduction of a relatively small SCB is not suppressed. In addition, the second metallocene compound enables the preparation of the high molecular weight polymer having certain activity and molecular weight which are different from those of polymer made by the first metallocene compound.

The preferable examples of the second metallocene compound represented by Formula 2 include compounds represented by following Formula 2a to Formula 2c.

[Formula 2a]

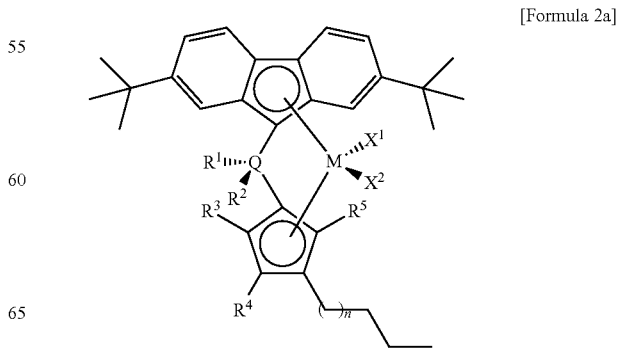

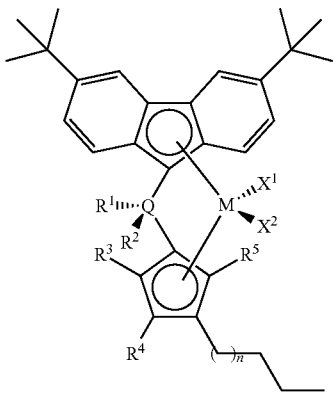
[Formula 2b]

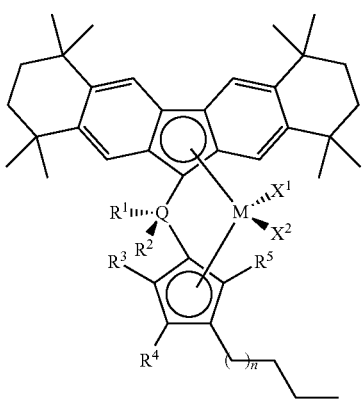
[Formula 2c]

In Formula 2a to Formula 2c, M is Ti, Zr or Hf; $R^1$ and $R^2$ are independently hydrogen atom or a hydrocarbonyl group of 1 to 10 carbon atoms; $R^3$, $R^4$ and $R^5$ are independently hydrogen atom or a hydrocarbonyl group of 1 to 10 carbon atoms; Q is carbon atom, silicon atom or germanium atom; $X^1$ and $X^2$ are independently F, Cl, Br, I or a hydrocarbonyl group of 1 to 10 carbon atoms; n is an integer of 1 to 7.

The more preferable example of the second metallocene compound represented by Formula 2 includes compound represented by following Formula 2d.

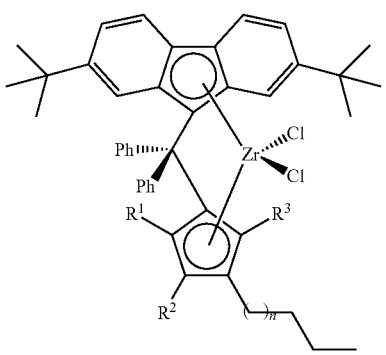
[Formula 2d]

In Formula 2d, $R^1$, $R^2$ and $R^3$ are independently hydrogen atom or methyl group; n is an integer of 1 to 3.

In the catalyst composition for olefin polymerization according to the present invention, the use amount of the second metallocene compound represented by Formula 2 is 0.01 to 100 moles, preferably 0.1 to 20 moles, more preferably 1 to 10 moles, with respect to 1 mole of the first metallocene compound represented by Formula 1. When the amount of the metallocene compound represented by Formula 1 is too little with respect to the amount of the second metallocene compound, it is worried that prepared polymer becomes mainly high molecular weight polymer, and when the amount of the metallocene compound represented by Formula 1 is too much with respect to the amount of the second metallocene compound, it is worried that prepared polymer becomes mainly low molecular weight polymer.

The aluminoxane is for activating catalyst component and scavenging impurities, and, for example, the aluminoxane represented by the following Formulas 3, 4 and 5 can be used. The aluminoxane may have a linear, cyclic or network structure, and, for example, a linear aluminoxane can be represented by the following Formula 4, and a cyclic aluminoxane can be represented by the following Formula 5. In the present invention, as the aluminoxane, an alkyl aluminoxane which is commercially available can be used. The non-limiting examples of the alkyl aluminoxane include methylaluminoxane, ethylaluminoxane, butylaluminoxane, isobutylaluminoxane, hexylaluminoxane, octylaluminoxane, decylaluminoxane, and so on. The aluminoxane is commercially available in various forms of hydrocarbon solutions. Preferable aluminoxane is an aromatic hydrocarbon solution of aluminoxane, and more preferable aluminoxane is an aluminoxane dissolved in toluene. In the present invention, a single aluminoxane or mixtures of more than one aluminoxane can be used. The alkyl aluminoxane can be prepared by various conventional methods such as adding proper amount of water to trialkylaluminum, or reacting a hydrocarbonyl compound having water or an inorganic hydrated salt with trialkylaluminum. Conventionally, a mixture of linear aluminoxane and cyclic aluminoxane is obtained.

The amount of aluminum of the aluminoxane is 1 to 100,000 mole, preferably, 1 to 5,000 mole, more preferably 1 to 2,500 mole, most preferably 1 to 1,000 mole with respect to 1 mole of sum of the first metallocene compound of Formula 1 and the second metallocene compound of Formula 2. For example, a mixture of the first metallocene compound and the aluminoxane is prepared in which with respect to 1 mole of the first metallocene compound, the amount of aluminum is 1 to 100,000 mole, preferably 1 to 5,000 mole, and then another mixture including the aluminoxane is prepared in which with respect to 1 mole of the second metallocene compound, the amount of aluminum is 1 to 100,000 mole, preferably 1 to 5,000 mole. Then two mixtures are mixed to prepare the olefin polymerization catalyst composition according to the present invention.

The mixture of the catalyst component composition can be made without specific limitations. For example, the first and second metallocene compound and the aluminoxane can be mixed for 5 minutes to 24 hours, preferably 15 minutes to 16 hours simultaneously. Alternatively, the first metallocene compound and the aluminoxane are mixed first for 5 minutes to 10 hours, preferably for 15 minutes to 4 hours to form a first mixture. Then, the second metallocene compound and the aluminoxane are mixed for 5 minutes to 10 hours, preferably for 15 minutes to 4 hours, to form a second mixture. Finally the first mixture and the second mixture are mixed for 5 minutes to 24 hours, preferably for 15 minutes to 16 hours. It is desirable that the compounds should be mixed under an inert atmosphere of nitrogen or argon, without a solvent, or in the presence of an inert hydrocarbon solvent such as heptane, hexane, benzene, toluene, xylene or mixtures thereof. The temperature of the mixing process is 0 to 150° C., preferably 10 to 100° C. The catalyst solution in which the catalyst is uniformly dissolved in the hydrocarbon solvent can be used as it stands, or the catalyst in a solid powder state after the solvent has been removed can be used. The catalyst in a solid powder state can be prepared by carrying out a precipitation reaction of the catalyst solution, and solidifying the precipitate from the reaction.

In the composition according to the present invention, the first and second metallocene compound and the aluminoxane may be supported by an organic or inorganic carrier. Therefore, the catalyst composition of the present invention can exist in a form supported by an organic or inorganic carrier (for example silica, alumina, mixture of silica and alumina, and so on) or a form of an insoluble particle of the carrier, as well as a form of a solid powder or a homogeneous solution. The method for contacting the catalyst composition of the present invention with the carrier will be explained, but the present invention is not limited to the following methods. At first, a solution state catalyst is prepared by mixing the first and second metallocene compound and the aluminoxane and then the catalyst prepared is contacted with a porous carrier (for example, a silica carrier having pore sizes of 50 to 500 Å and a pore volume of 0.1 to 5.0 cm$^3$/g) to form a slurry. Next, the catalyst of the slurry state is treated with an acoustic wave or oscillating wave having the frequency of 1 to 10.000 kHz, preferably 20 to 500 kHz at 0° C. to 120° C., preferably 0° C. to 80° C. for 0.1 to 6 hours, preferably 0.5 to 3 hour, to uniformly infiltrate the catalyst components into the pores of the carrier. And then, the catalyst slurry is dried under vacuum or nitrogen flow to form a catalyst of a solid powder state. The acoustic wave or oscillating wave is preferably ultrasonic waves. After applying the acoustic wave or the oscillating wave to the catalyst, the step of supporting the catalyst on a carrier may also include the step of washing the supported catalyst with a hydrocarbon selected from the group consisting of pentane, hexane, heptane, isoparaffin, toluene, xylene and mixtures thereof.

As the porous carrier, porous inorganic compounds, inorganic salts, and organic compounds with micro pores and a large surface area can be used without restrictions. The shape of the inorganic carrier is not limited if the shape can be maintained during the preparation process of the supported catalysts, and may be in any shape such as powder, particle, flake, foil, fiber, and so on. Regardless of the shape of the inorganic carrier, the maximum length of the inorganic carrier is generally from 5 to 200 µm, preferably from 10 to 100 µm, the preferable surface area of the inorganic carrier is 50 to 1,000 m$^2$/g and the preferable pore volume is 0.05 to 5 cm$^3$/g. Generally, the inorganic carrier should be treated to remove water or hydroxyl group therefrom before the use. The treatment can be carried out by calcining the carrier at 200° C. to 900° C. under an inert atmosphere such as air, nitrogen, argon, or so on. Non-limiting examples of the inorganic salt carrier or the inorganic carrier include silica, alumina, bauxite, zeolite, magnesium chloride ($MgCl_2$), calcium chloride ($CaCl_2$), magnesium oxide (MgO), zirconium dioxide ($ZrO_2$), titanium dioxide ($TiO_2$), boron trioxide ($B_2O_3$), calcium oxide (CaO), zinc oxide (ZnO), barium oxide (BaO), thorium oxide ($ThO_2$) and mixtures thereof such as silica-magnesium oxide ($SiO_2$—MgO), silica-alumina ($SiO_2$—$Al_2O_3$), silica-titanium dioxide ($SiO_2$—$TiO_2$), silica-vanadium pentoxide ($SiO_2$—$V_2O_5$), silica-chromium trioxide ($SiO_2$—$CrO_3$), silica-titanium dioxide-magnesium oxide ($SiO_2$—$TiO_2$—MgO) or so on. Small amount of carbonate, sulfate, or nitrate can be added to these compounds. Non-limiting examples of the organic carrier include starch, cyclodextrin, synthetic polymer or so on. Examples of the solvent, which is used for bringing the catalyst of the present invention into contact with the carrier, include an aliphatic hydrocarbon solvent such as pentane, hexane, heptane, octane, nonane, decane, undecane, dodecane and so on, an aromatic hydrocarbon solvent such as benzene, monochlorobenzene, dichlorobenzene, trichlorobenzene, toluene and so on, a halogenated aliphatic hydrocarbon solvent such as dichloromethane, trichloromethane, dichloroethane, trichloroethane, and so on. When the olefin polymerization catalyst composition according to the present invention is supported in the carrier, each components of the olefin polymerization catalyst composition is the same in the solution or solid state. The carrier amount of aluminum in the olefin polymerization catalyst composition is 5 to 30 weight part, preferably 7 to 20 weight part with respect to 100 weight part of the carrier, and the carrier amount of the transition metal compound in the olefin polymerization catalyst composition is 0.01 to 2 weight part, preferably 0.05 to 1.5 weight part with respect to 100 weight part of the carrier.

Next, the present polyolefin polymerization process will be described. The polymerization process includes a step of polymerizing olefin monomer, preferably ethylene and alpha-olefin of 3 to 20 carbon atoms under the catalyst composition of the present invention. The catalyst composition of the present invention can exist in a form supported by an inorganic or organic carrier or a form of an insoluble particle of the carrier, as well as a form of a homogeneous solution. Thus, the polyolefin of the present invention can be polymerized in a solution phase, a slurry phase, a bulk phase or a gas phase polymerization reaction. The conditions for the polymerization reactions can be varied according to the state of the catalyst (homogeneous or heterogeneous phase (supported phase)), the polymerization method (solution polymerization, slurry polymerization, gas phase polymerization), target polymer properties or the polymer shape. When the polymerization is carried out in a solution phase or a slurry phase, a solvent or olefin itself may work as a reaction medium. Examples of the solvent include propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and so on, and, if necessary, mixtures of the solvents can be used. In the polymerization or copolymerization of olefin according to the present invention, the amount of the first and second metallocene compound is not limited especially. However, the concentration of the central metal of the first and second metallocene compound is preferably $10^{-8}$ to $10^1$ mol/l, and more preferably $10^{-7}$ to $10^{-2}$ mol/l in a polymerization reaction system.

In the olefin polymerization or copolymerization of the present invention, the polymerization temperature is generally 70 to 110° C., which is not especially limited because it can be varied according to reactants, reaction conditions, and so on. However, the polymerization temperature is generally 0 to 250° C., and more preferably 10 to 200° C. in a solution polymerization, and generally 0 to 120° C., and more preferably 20 to 110° C. in a slurry or a gas phase polymerization. The polymerization pressure is generally atmospheric pressure to 500 kg/cm$^2$, preferably atmospheric pressure to 60 kg/cm$^2$, more preferably atmospheric pressure to 10 to 60 kg/cm$^2$. The polymerization reaction can be carried out in a batch type, a semi-continuous type, or a continuous type reaction. The polymerization can be carried out by two or more steps of different reaction conditions. The molecular weight and molecular weight distribution of the resulting polymer can be controlled by changing the polymerization temperature, or by injecting hydrogen into a reactor. The polyolefin resin polymerization of the present invention can be carried out by using a conventional single loop reactor, gas phase reactor, ICFB (internally circulating fluidized-bed) reactor (Referring to Korean Patent Nos. 10-981612, 10-999543 and 10-999551 etc).

In the present invention, the polyolefin can be polymerized through a main polymerization and a pre-polymerization. In the pre-polymerization process, the olefin polymer or copolymer is produced in the amount of 0.05 to 500 g, preferably 0.1 to 300 g, and more preferably 0.2 to 100 g with respect to 1 g of the olefin catalyst. Examples of the olefin suitable for the pre-polymerization, include α-olefin of 2 to 20 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, and so on. And it is preferable that olefin for the pre-polymerization is the same one for the main polymerization.

As olefin monomer constituting the polyolefin according to the present invention, linear aliphatic olefin of 2 to 12, preferably 2 to 10 carbon atoms, cyclic olefins of 3 to 24, preferably 3 to 18 carbon atoms, dienes, trienes, styrenes, and so on can be used. Example of the linear aliphatic olefin includes ethylene, propylene, butene-1, pentene-1,3-methylbutene-1, hexene-1,4-methylpentene-1,3-methylpentene-1, heptene-1, octene-1, decene-1,4,4-dimethyl-1-pentene, 4,4-diethyl-1-hexene, 3,4-dimethyl-1-hexene, or so on. Example of the cyclic olefins include cyclopentene, cyclobutene, cyclohexene, 3-methylcyclohexene, cyclooctene, tetracyclodecene, octacyclodecene, dicyclopentadiene, norbonene, 5-methyl-2-norbonene, 5-ethyl-2-norbonene, 5-isobutyl-2-norbonene, 5,6-dimethyl-2-norbonene, 5,5,6-trimethyl-2-norbonene, ethylene norbonene, and so on. The preferable dienes and trienes include a polyene of 4 to 26 carbon atoms having two or three double bonds. Specific examples of the dienes and the trienes include 1,3-butadiene, 1,4-pentadiene, 1,4-hexadiene, 1,5-hexadiene, 1,9-decadiene, 2-methyl-1,3-butadiene, and so on. Preferable examples of the styrenes include styrene or substituted styrene substituted with an alkyl group of 1 to 10 carbon atoms, alkoxy group of 1 to 10 carbon atoms, a halogen group, an amine group, a silyl group, halogenated alkyl group and so on. The olefin monomers may be polymerized to form a homo-polymer, an alternating copolymer, a random copolymer or a block copolymer.

Preferably, the polyolefin resin of the present invention is a homo-polymer or copolymer selected from a group of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eitocene, norbornene, norbonadiene, ethylidene norbornene, phenyl norbornene, vinyl norbornene, dicyeclopentadiene, 1,4-butadiene, 1,5-butadiene, 1,5-pentadiene, 1,6-hexadiene, styrene, alpha-methylstyrene, divinylbenzene and 3-chloromethylstyrene. Further, the polyolefin resin of the present invention includes a main component which is selected from a group of ethylene, propylene and mixture thereof and an auxiliary component. It is preferable to contain 0.01 to 3.0 weight % of structural unit derived from α-olefin of 4 to 10, for example 6 to 8 carbon atoms, as the auxiliary component.

The present invention also provides a polyolefin copolymer prepared by the present polymerizing method and a molded product containing the polyolefin copolymer. The Examples of the molded product include a blow molded product, an inflation molded product, a cast molded product, an extrusion lamination molded product, an extrusion molded product, a foam molded product, an injection molded product, sheets, films, fibers, monofilaments, nonwoven fabric and pipes etc.

MODE FOR THE INVENTION

Hereinafter, the preferable examples are provided for better understanding of the present invention. However, the present invention is not limited to the following examples. In the following examples, the catalyst was produced with Schlenk method in which air and moisture were completely blocked, and specifically, process and operation of the air-sensitive reagents and substances were conducted in Schlenk tube (Schlenk line) or in a glove box filled nitrogen. Reagents were typically purchased from Sigma-Aldrich Chemical Company, and used without further purification, and used a purified and dried nitrogen as an inert gas. Zirconium (IV) chloride (99.5%) and normal butyl lithium were purchased from Boulder Scientific Company and Aldrich Chemical Company, and were used as it is. Bis[iso-butyl cyclopentadienyl]zirconium dichloride and bis[normal-butyl cyclopentadienyl]zirconium dichloride were purchased from commercially such as Chemtura. In addition, all of the solvent were dried with sodium metal and calcium hydride under inert nitrogen atmosphere. In the present specification and examples, the method for measuring respective physical property is as follows. In the specification and the Examples, various properties were measured as follows.

(1) Density: Density was measured in accordance with ASTM 1505 and ASTM D 1928

(2) Melt flow index (MIE, 2.16 kg/10 minutes): MIE was measured in accordance with ASTM D1238 at 190° C.

(3) High load MIE (MIF, 21.6 kg/10 minutes): MIF was measured in accordance with ASTM D1238 at 190° C.

(4) Shear response (SR): MIF/MIE (5) Molecular weight and molecular weight distribution (polydispersity): They were measured by using GPC (Polymer Laboratory Inc. 220 system) as follows. As separation columns, two Olexis and one Guard were used, and the column temperature was maintained at 160° C. As a calibration, a standard polystyrene set by Polymer Laboratory Inc was used, and as an eluant, trichlorobenzen containing 0.0125 weight % of BHT (antioxidant) was used. Samples were prepared in a ratio of 0.1~1 mg/ml, injection amount was 0.2 ml, injection time was 30 minutes, pump flow rate was maintained at 1.0 ml/min, measurement time was for 30 to 60 minutes. After universal calibration was made by using polystyrene standard materials of Easical A and Easical B (Produced by Agilent technologies), conversion to polyethylene was carried out to measure number-average molecular weight (Mn), weight-average molecular weight (Mw), and z average molecular weight (Mz). As a detector, a RI (Refractive Index) detector was used. The molecular weight distribution (Mw/Mn) represents the ratio of weight average molecular weight to number average molecular weight.

(6) PENT: PENT was measured in accordance with ASTM D1473. The test chip was prepared from a press sheet having 6 mm thickness by using a thermal hydraulic pressure set at 190° C. (produced by Shindong Metal Industrial Co., Ltd.), with a pressure of 100 kg/cm². Notches were formed at three sides of the test chip (the notch in wide side has 2.5 mm depth, and the notch in shallow side has 1 mm depth). The test chips were placed in a chamber at 95° C. in which the top part and the lower part of the test chip was fixed and a pressure of 3.7 MPa was applied to thereby measuring fail time of the test chip.

Manufacturing Example 1

Preparation of Second Metallocene Compound

A. Synthesis of 1-(cyclopentadienyl)-1-(2,7-di-tert-butylfluorenyl)-1,1-diphenylmethane After 2,7-di-tert-butylfluorene (39.21 mmol, 10.907 g) was dissolved in tetrahydrofuran (THF, 53 ml), it was cooled with ice water, and normalbutyllithium-hexane solution (2.5 M, 41.166 mmol, 16.47 ml) was dropped to the cooled solution by a syringe and then stirred at room temperature for 12 hours. After this solution was cooled with ice water again, solution in which 6,6-diphenylfulvene (39.21 mmol, 9.029 g) was dissolved in tetrahydrofuran (THF, 50 ml) was dropped to the cooled solution by a cannula and then stirred at room temperature for 24 hours. After completion of the reaction, an aqueous solution of ammonium chloride was added to a reaction product. The organic layer was extracted from the reaction product by using a separatory funnel, and dried to anhydrous magnesium sulfate. Subsequently, the solvent was removed in a vacuum from the reaction product, then purification was carried out with the chloroform and methanol to obtain a solid compound of the following Formula 6 (Yield: 65%).

[Formula 6]

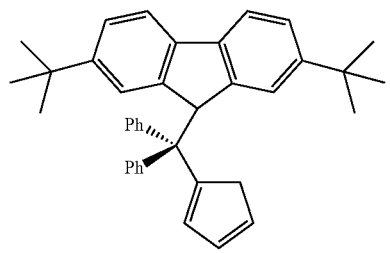

B. Synthesis of 1-(normalbutylcyclopentadienyl)-1-(2,7-di-tert-butylfluorenyl)-1,1-diphenylmethane After the compound of Formula 6 (12.793 mmol, 6.508 g) was dissolved in tetrahydrofuran (THF, 150 ml), it was cooled to −78° C., normalbutyllithium-hexane solution (2.5 M, 12.793 mmol, 5.1 ml) was dropped to the cooled solution by a syringe and then stirred for 2 hours with maintaining the temperature at −78° C. With maintaining the temperature, 1-bromobutane (14.072 mmol, 1.928 g, 1.51 ml) was dropped to the stirred solution by a syringe and then the mixture was stirred for 2 hours, and again stirred at room temperature for 12 hours. After completion of the reaction, solvent was removed in a vacuum from the reaction product, and the product was dissolved in dichloromethane solvent and then filtration was carried out to remove the undissolved substances. Subsequently, a methanol was added to the filtered solution to obtain a solid compound of the following Formula 7 (Yield: 70%).

[Formula 7]

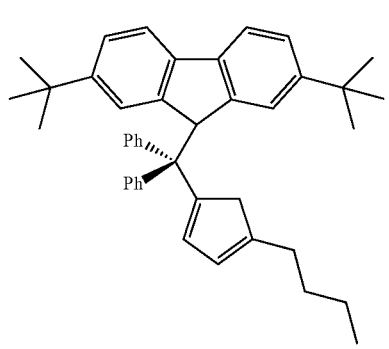

C. Synthesis of 1-(normalbutylcyclopentadienyl)-1-(2,7-di-tert-butylfluorenyl)-1,1-diphenylmethylidene zirconium dichloride After the compound of Formula 7 (4.217 mmol, 2.38 g) was dissolved in diethylether (25 ml), it was cooled with ice water, and normalbutyllithium-hexane solution (2.5 M, 10.121 mmol, 4.1 ml) was dropped to the cooled solution by a syringe and then was stirred at room temperature for 12 hours. The suspension which was prepared by adding zirconiumchloride (4.217 mmol, 0.968 g) to hexane (28 ml) was dropped to the reaction solution by a cannula and then the mixture was stirred at room temperature for 24 hours. After completion of the reaction, solvent was removed from the reaction product in a vacuum Then the product was dissolved in dichloromethane solvent and filtration was carried out to remove the undissolved substances. Subsequently, the solvent of the filtered solution was removed in a vacuum again, and washing process was carried out by using hexane solvent to obtain a solid compound of the following Formula 8 (Yield: 88%).

[Formula 8]

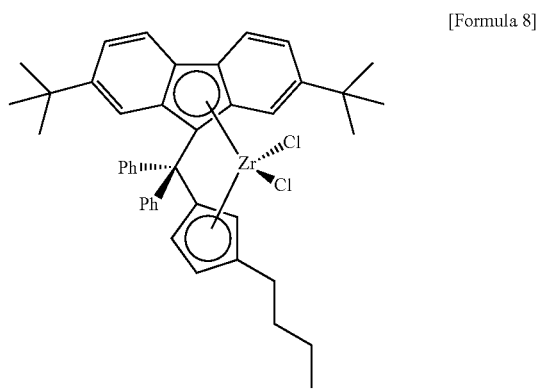

Manufacturing Example 2

Preparation of Second Metallocene Compound

A. Synthesis of 1-(methylcyclopentadienyl)-1-(2,7-di-tert-butylfluorenyl)-1,1-diphenylmethane Except for using methyliodide instead of 1-bromobutane, a solid compound of the following Formula 9 was obtained in the same manner with step B of the Manufacturing Example 1.

[Formula 9]

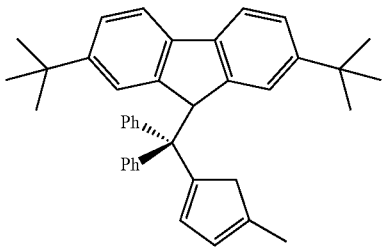

B. Synthesis of 1-(methylcyclopentadienyl)-1-(2,7-di-tert-butylfluorenyl)-1,1-diphenylmethylidene zirconium dichloride Except for using compound of the Formula 9 instead of compound of the Formula 7, a compound of the following Formula 10 was obtained in the same manner with step C of the Manufacturing Example 1.

[Formula 10]

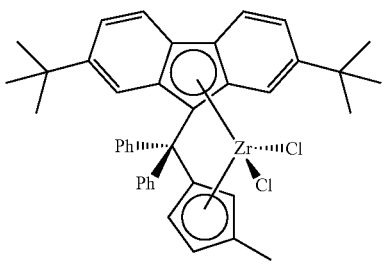

Manufacturing Example 3

Preparation of Second Metallocene Compound

A. Synthesis of 1-(normalpropylcyclopentadienyl)-1-(2,7-di-tert-butylfluorenyl)-1,1-diphenylmethane Except for using 1-bromopropane instead of 1-bromobutane, a solid compound of the following Formula 11 was obtained in the same manner with step B of the Manufacturing Example 1.

[Formula 11]

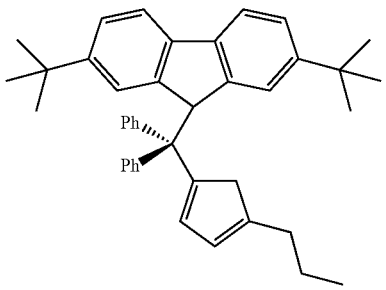

B. Synthesis of 1-(normalpropylcyclopentadienyl)-1-(2,7-di-tert-butylfluorenyl)-1,1-diphenylmethylidene zirconium dichloride Except for using compound of the Formula 11 instead of compound of the Formula 7, a compound of the following Formula 12 was obtained in the same manner with step C of the Manufacturing Example 1.

[Formula 12]

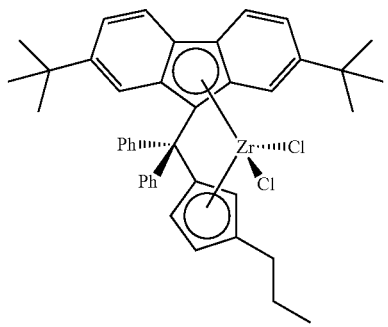

Examples 1 to 11 and Comparative Examples 1 to 6

Preparation of Supported Catalyst

According to the Following Table 1, a first metallocene compound, the second metallocene compound prepared from the Manufacturing Examples and methylaluminoxane (MAO, Albemarle Co., Ltd, 10% toluene solution) were poured into 500 ml flask of nitrogen atmosphere, and the mixture was stirred at room temperature for 60 minutes. A calcined silica ($SiO_2$) was added to the stirred mixture at 250° C., and then ultrasonic wave was applied thereto for 1 hour to remove the supernatant. Washing with hexane was carried out twice to remove remaining solid particles, and drying in vacuum was carried out to prepare a free-flowing supported catalyst of solid powder type. Injection amount of the first metallocene compound was controlled as 20 to 80 mol % ratio in considering an activity of the each second metallocene compound. Amount of aluminum of the supported catalyst was 12.5 to 13.0 weight %, and an amount of the zirconium was 0.2 to 0.3 weight %. A mol ratio of the aluminum to zirconium was controlled as 80 to 230.

TABLE 1

| | First metallocene | | Second metallocene | | MAO | Silica |
|---|---|---|---|---|---|---|
| | Type | (g) | Type | (g) | (ml) | (g) |
| Example 1 | (i-BuCp)$_2$ZrCl$_2$ | 0.078 | Ph$_2$C(2,7-t-BuFlu)(n-BuCp)ZrCl$_2$ | 0.093 | 50 | 10 |
| Example 2 | (i-BuCp)$_2$ZrCl$_2$ | 0.065 | Ph$_2$C(2,7-t-BuFlu)(n-BuCp)ZrCl$_2$ | 0.116 | 50 | 10 |
| Example 3 | (i-BuCp)$_2$ZrCl$_2$ | 0.107 | Ph$_2$C(2,7-t-BuFlu)(n-BuCp)ZrCl$_2$ | 0.187 | 50 | 10 |
| Example 4 | (i-BuCp)$_2$ZrCl$_2$ | 0.058 | Ph$_2$C(2,7-t-BuFlu)(n-BuCp)ZrCl$_2$ | 0.128 | 50 | 10 |
| Example 5 | (i-BuCp)$_2$ZrCl$_2$ | 0.052 | Ph$_2$C(2,7-t-BuFlu)(n-BuCp)ZrCl$_2$ | 0.139 | 50 | 10 |
| Example 6 | (i-BuCp)$_2$ZrCl$_2$ | 0.043 | Ph$_2$C(2,7-t-BuFlu)(n-BuCp)ZrCl$_2$ | 0.155 | 50 | 10 |
| Example 7 | (i-BuCp)$_2$ZrCl$_2$ | 0.071 | Ph$_2$C(2,7-t-BuFlu)(n-BuCp)ZrCl$_2$ | 0.255 | 50 | 10 |

TABLE 1-continued

|  | First metallocene |  | Second metallocene |  | MAO | Silica |
|---|---|---|---|---|---|---|
|  | Type | (g) | Type | (g) | (ml) | (g) |
| Example 8 | (i-BuCp)$_2$ZrCl$_2$ | 0.032 | Ph$_2$C(2,7-t-BuFlu)(n-BuCp)ZrCl$_2$ | 0.174 | 50 | 10 |
| Example 9 | (i-BuCp)$_2$ZrCl$_2$ | 0.053 | Ph$_2$C(2,7-t-BuFlu)(n-BuCp)ZrCl$_2$ | 0.286 | 50 | 10 |
| Example 10 | (i-BuCp)$_2$ZrCl$_2$ | 0.094 | Ph$_2$C(2,7-t-BuFlu)(n-BuCp)ZrCl$_2$ | 0.501 | 50 | 10 |
| Example 11 | (i-BuCp)$_2$ZrCl$_2$ | 0.043 | Ph$_2$C(2,7-t-BuFlu)(n-BuCp)ZrCl$_2$ | 0.305 | 50 | 10 |
| Comparative Example 1 | (n-BuCp)$_2$ZrCl$_2$ | 0.071 | Ph$_2$C(2,7-t-BuFlu)(n-BuCp)ZrCl$_2$ | 0.255 | 50 | 10 |
| Comparative Example 2 | (n-BuInd)$_2$ZrCl$_2$ | 0.106 | Ph$_2$C(2,7-t-BuFlu)(n-BuCp)ZrCl$_2$ | 0.038 | 25 | 5 |
| Comparative Example 3 | (Me$_4$Cp)(n-BuCp)ZrCl$_2$ | 0.069 | Ph$_2$C(2,7-t-BuFlu)(n-BuCp)ZrCl$_2$ | 0.061 | 25 | 5 |
| Comparative Example 4 | (i-BuCp)$_2$ZrCl$_2$ | 0.071 | Ph$_2$C(2,7-t-BuFlu)(MeCp)ZrCl$_2$ | 0.24 | 50 | 10 |
| Comparative Example 5 | (i-BuCp)$_2$ZrCl$_2$ | 0.107 | Ph$_2$C(2,7-t-BuFlu)(n-PrCp)ZrCl$_2$ | 0.187 | 50 | 10 |
| Comparative Example 6 | (i-BuCp)$_2$ZrCl$_2$ | 0.106 | Ph$_2$C(2,7-t-BuFlu)(n-BuCp)ZrCl$_2$ Ph$_2$C(2,7-t-BuFlu)(MeCp)ZrCl$_2$ | 0.141 0.047 | 50 | 10 |

Examples 12 to 22

Copolymerization of Ethylene/1-Hexene and Test of Physical Properties of the Copolymer A isobutane and ethylene flowed to a 2 L stainless autoclave reactor equipped with a jacket which can supply an external cooling water for controlling a polymerization temperature, once and five times respectively at about 110° C., thereby removing impurities, and the reactor was lowered to temperature of 80° C. Isobutane (900 mL) and triethylaluminum (TEAL, 0.02 mmol) of a impurity remover were added to the cleaned reactor and the mixture was stirred at 80° C. Isobutane (100 mL) and the supported catalyst (about 60 mg) prepared at the Examples 1 to 11 were injected to the reactor, and then 1-hexene (weight %, input of 1-hexene with respect to the ethylene injected) and hydrogen (mg/kgC2, input (mg) of hydrogen with respect to 1 kg of the ethylene injected) were injected to the reactor according to the following Table 2 and 3, while injecting ethylene so as for partial pressure of ethylene to be of 160 psig. Then while keeping the total pressure of the reactor at each reaction temperature, the polymerization was carried out for 60 to 120 minutes. During the polymerization, the partial pressure of ethylene was being maintained constantly, 1-hexene and hydrogen were continuously introduced in linked with the ethylene. After the polymerization was completed, the unreacted 1-hexene and isobutene were drained out, and then the reactor was opened to collect a polymer (copolymer) having a free flowability. An activity of the catalyst (gPE/gCat-hr), and a molecular weight (Mw/1000: weight average molecular weight), polydispersity (MWD), melt index E (MIE, g/10 min), high load melt index F (MIF, g/10 min), melt index ratio (SR (MIF/MIE)), density of the produced polymer, etc. were measured and the results were shown in Tables 2 and 3. In following Table 2, Type I ratio represents a ratio of the first metallocene compound in the total metallocene compound.

TABLE 2

|  | Example 12 | Example 13 | Example 14 | Example 15 | Example 16 | Example 17 |
|---|---|---|---|---|---|---|
| catalyst | Example 1 | Example 2 | Example 3 | Example 4 | Example 5 | Example 6 |
| Ratio of Type I (mol %) | 60 | 50 | 50 | 45 | 40 | 33 |
| Molar ratio of Al/Zr | 230 | 230 | 140 | 230 | 230 | 230 |
| TEAL (mmol) | 0.02 | 0.02 | 0.02 | 0.02 | 0.02 | 0.02 |
| Temperature of polymerization (° C.) | 90 | 90 | 90 | 90 | 90 | 90 |
| Use time of polymerization (min.) | 60 | 60 | 60 | 60 | 60 | 60 |
| ethylene (psig) | 160 | 160 | 160 | 160 | 160 | 160 |
| 1-hexene (wt %) | 7 | 7 | 7 | 7 | 7 | 7 |
| hydrogen (ppm) | 100 | 100 | 100 | 100 | 100 | 100 |
| activity | 5032 | 5922 | 6776 | 5567 | 4325 | 4317 |
| Molecular weight distribution | bimodal | bimodal | bimodal | bimodal | bimodal | bimodal |
| Mw/1,000 | 138 | 137 | 124 | 132 | 169 | 249 |
| MWD | 8.88 | 7.94 | 15.07 | 10.16 | 11.32 | 6.25 |
| MIE | 0.50 | 0.33 | 0.24 | 0.29 | 0.16 | 0.02 |
| MIF | 48.06 | 35.63 | 32.81 | 35.63 | 13.25 | 1.72 |
| SR(F/E) | 95.4 | 109.0 | 137.8 | 122.5 | 83.9 | 90.5 |
| density | 0.940 | 0.938 | 0.942 | 0.937 | 0.937 | 0.941 |

TABLE 3

|  | Example 18 | Example 19 | Example 20 | Example 21 | Example 22 |
|---|---|---|---|---|---|
| catalyst | Example 7 | Example 8 | Example 9 | Example 10 | Example 11 |
| Ratio of Type I (mol %) | 33 | 25 | 25 | 25 | 20 |

TABLE 3-continued

|  | Example 18 | Example 19 | Example 20 | Example 21 | Example 22 |
|---|---|---|---|---|---|
| Molar ratio of Al/Zr | 140 | 230 | 140 | 80 | 140 |
| TEAL (mmol) | 0.02 | 0.02 | 0.02 | 0.02 | 0.02 |
| Temperature of polymerization (° C.) | 85 | 75 | 75 | 75 | 75 |
| Use time of polymerization (min.) | 60 | 120 | 120 | 120 | 120 |
| ethylene (psig) | 160 | 130 | 130 | 130 | 130 |
| 1-hexene (wt %) | 7 | 15 | 7 | 15 | 7 |
| hydrogen (ppm) | 200 | 300 | 200 | 300 | 200 |
| activity | 5424 | 2433 | 2,053 | 3867 | 1852 |
| Molecular weight distribution | bimodal | bimodal | bimodal | bimodal | bimodal |
| Mw/1,000 | 162 | 237 | 170 | 233 | 123 |
| MWD | 19.73 | 11.06 | 19.55 | 8.50 | 16.88 |
| MIE | 0.26 | 0.03 | 0.21 | 0.02 | 0.89 |
| MIF | 9.85 | 2.10 | 19.50 | 2.79 | 27.93 |
| SR(F/E) | 37.8 | 77.6 | 95.6 | 116.2 | 31.3 |
| density | 0.937 | 0.922 | 0.943 | 0.923 | 0.935 |

Comparative Examples 7 to 12

Copolymerization of Ethylene/1-Hexene and Test of Physical Properties of the Copolymer Using the supported catalyst prepared in Comparative Examples 1 to 6, copolymer was prepared by using the same manner with Example 12, and the physical properties of the polymerized copolymer were tested and the results were shown in following Table 4.

TABLE 4

|  | Comparative Example 7 | Comparative Example 8 | Comparative Example 9 | Comparative Example 10 | Comparative Example 11 | Comparative Example 12 |
|---|---|---|---|---|---|---|
| catalyst | Comparative Example 1 | Comparative Example 2 | Comparative Example 3 | Comparative Example 4 | Comparative Example 5 | Comparative Example 6 |
| Ratio of Type I (mol %) | 33 | 80 | 67 | 40 | 50 | 50 |
| Molar ratio of Al/Zr | 140 | 140 | 140 | 140 | 140 | 140 |
| TEAL (mmol) | 0.02 | 0.02 | 0.02 | 0.02 | 0.02 | 0.02 |
| Temperature of polymerization (° C.) | 75 | 85 | 85 | 85 | 85 | 85 |
| Use time of polymerization (min.) | 120 | 60 | 60 | 60 | 60 | 60 |
| ethylene (psig) | 130 | 160 | 160 | 160 | 160 | 160 |
| 1-hexene (wt %) | 7 | 7 | 7 | 7 | 7 | 7 |
| hydrogen (ppm) | 200 | 400 | 200 | 200 | 100 | 100 |
| activity | 2067 | 1470 | 3175 | 887 | 2130 | 2975 |
| Molecular weight distribution | bimodal | bimodal | bimodal | bimodal | bimodal | bimodal |
| Mw/1,000 | 129 | 356 | 291 | 290 | 133 | 248 |
| MWD | 46.99 | 24.02 | 10.34 | 73.46 | 13.67 | 14.25 |
| MIE | 0.41 | 0.02 | 0.02 | — | 0.14 | 0.04 |
| MIF | 34.44 | 4.068 | 1.622 | 13.77 | 18.79 | 2.8 |
| SR(F/E) | 83.2 | 215.2 | 101.4 | >1000 | 135.2 | 71.8 |
| density | 0.935 | 0.947 | 0.939 | 0.948 | 0.941 | 0.945 |

Figure 2:
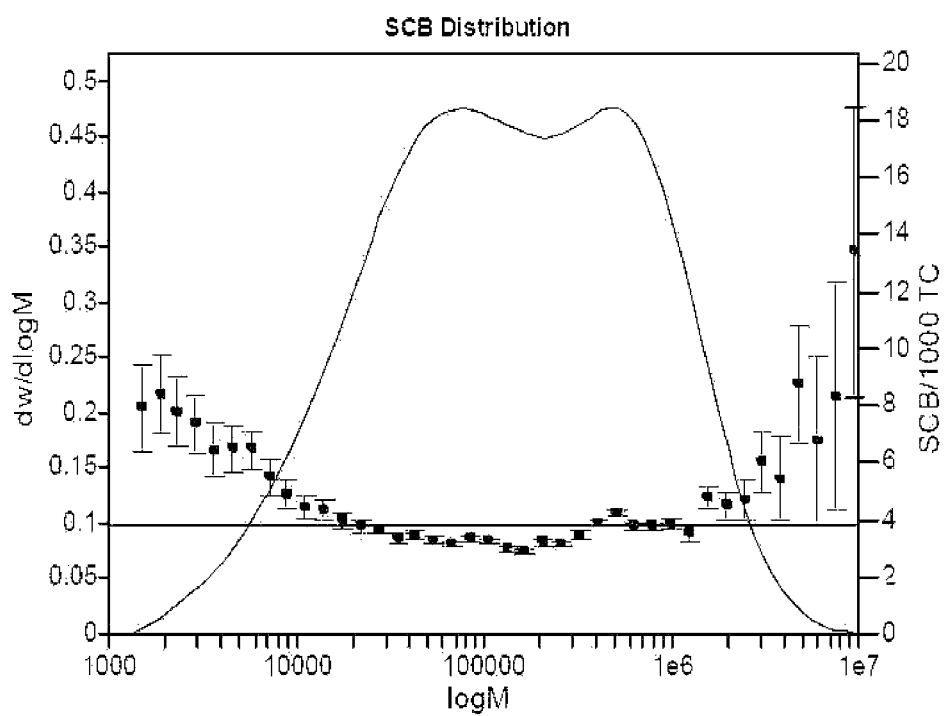
Figure 3:
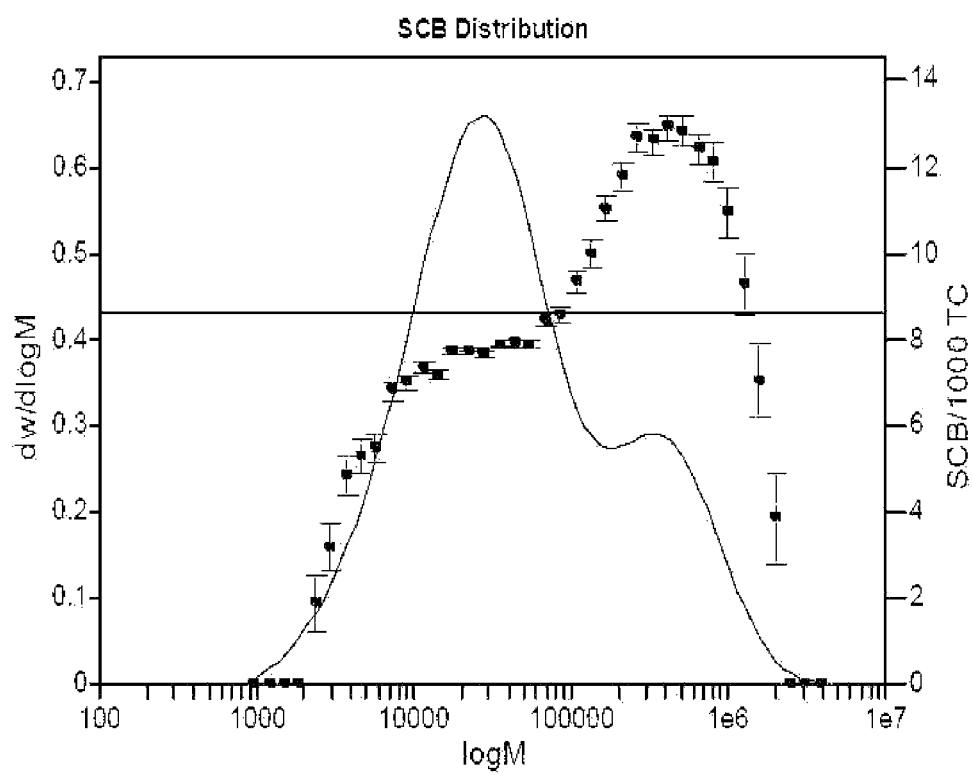
FIGS. 3 to 5 show graphs illustrating comonomer distributions of the copolymers obtained by the Examples 13, 18 and 22, which are obtained by GPC-IR analysis.
Figure 4:
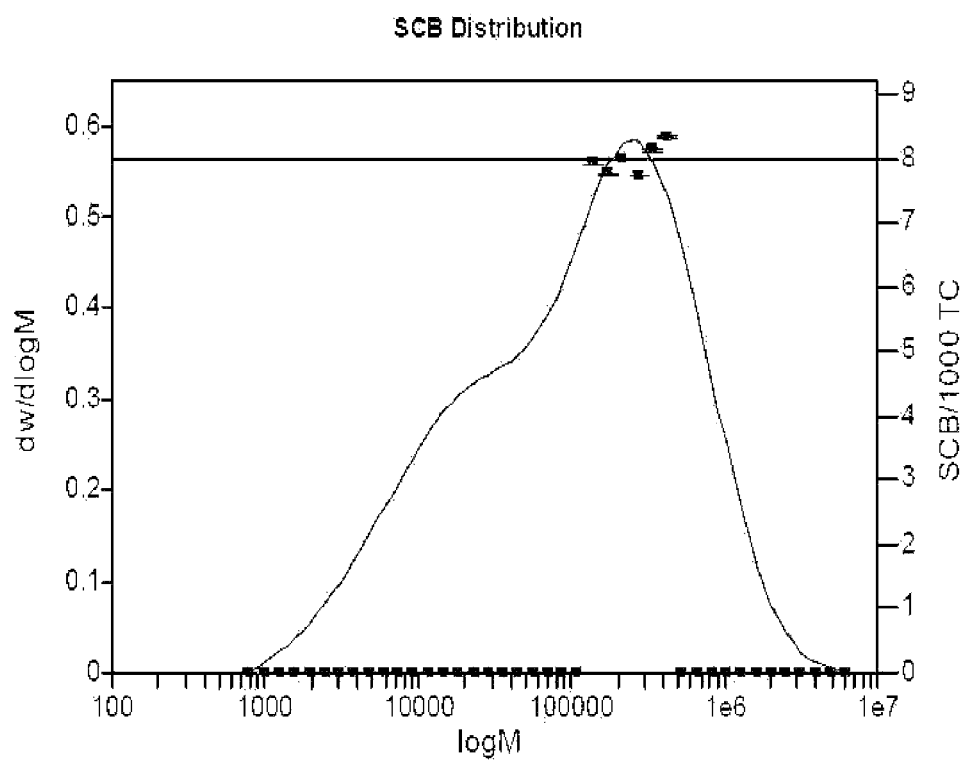
Figure 5:
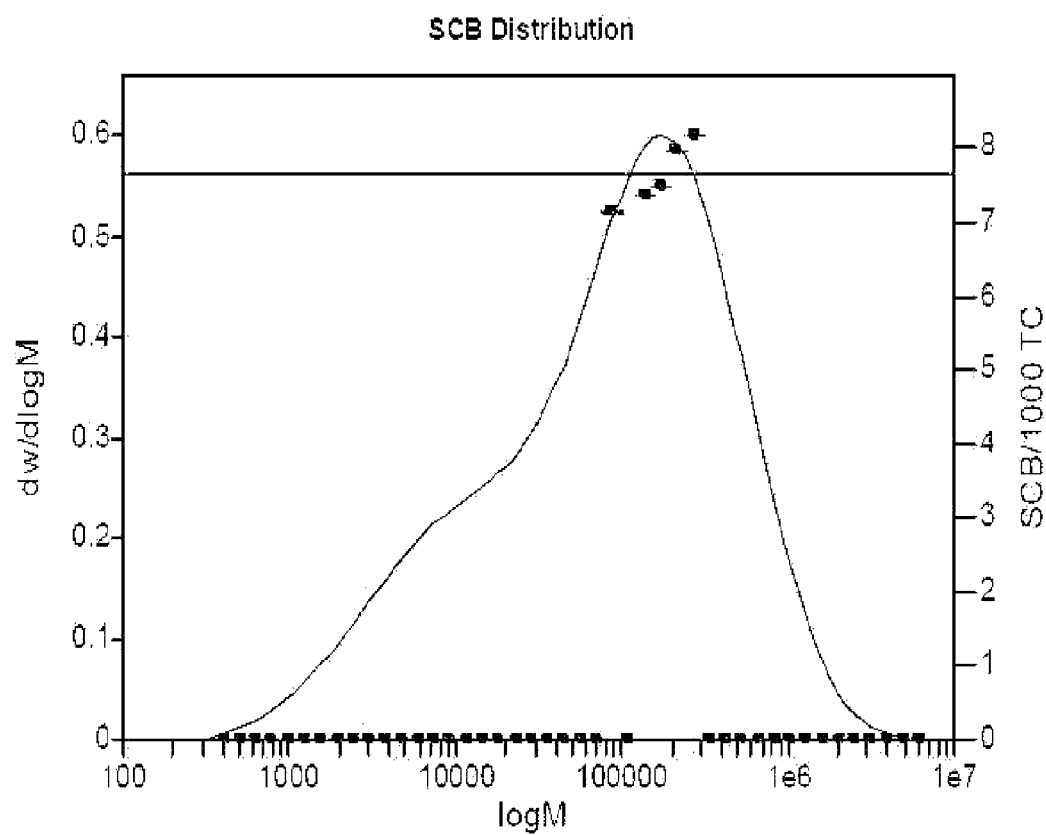

Further, with respect to the copolymer obtained in Comparative Examples 7 and 8, the GPC-IR analysis was performed to ascertain the distribution of the comonomer, and the results were shown in FIG. 1 and FIG. 2 respectively. In FIG. 1 and FIG. 2, M is a molecular weight, w is a weight ratio of the copolymer, a blue solid line indicates a GPC curve showing a molecular weight distribution, and a red dot indicates a distribution of SCB (Short Chain Branch) in the molecule chain, namely, represents the number of comonomer contained per 1,000 carbon atoms in each molecular weight area which is expressed as a GPC curve. As shown in FIG. 1 and FIG. 2, it can be seen that in copolymer obtained from Comparative Examples 7 and 8, amount of comonomer is much in a low molecular weight portion and relatively small in a high molecular weight portion. Also, it can be seen from FIG. 2 that control of the molecular weight may not be easy because bis-normalbutylindenyl zirconium dichloride compound used as the first metallocene compound in Comparative Example 8 has considerably low hydrogen reactivity. Further, with respect to the copolymer obtained from Examples 13, 18 and 22, the GPC-IR analysis was performed to ascertain the distribution of the comonomer, and the results were shown in FIG. 3 to FIG. 5 respectively. From FIG. 3 to FIG. 5, it can be seen that in the copolymer copolymerized according to the present invention, amount of comonomer is small in a low molecular weight portion and relatively much in a high molecular weight portion. Further, in the second metallocene compound, if the carbon number of the substituent bonded to the ligand is less (Comparative Example 10), the activity of the second metallocene compound is low compared to the first metallocene compound, and gap of the molecular weight between the first metallocene compound and second metallocene compound is too big. Hence, physical properties gets worse significantly of SR being 1000 or later, and an appearance status be very bad conditions, it is difficult to apply as a commercial product.

Further, in order to evaluate long-term physical properties of polymer obtained from Examples 14, 18, 20 and Comparative Examples 7, 10, 11, 12, PENT analysis was performed and the results were shown in following Table 5.

TABLE 5

|  | Example 14 | Example 18 | Example 20 | Example 22 | Example 7 | Example 10 | Example 11 | Example 12 |
|---|---|---|---|---|---|---|---|---|
| catalyst | Example 3 | Example 7 | Example 9 | Example 11 | Example 1 | Example 4 | Example 5 | Example 6 |
| Mw/1000 | 124 | 162 | 170 | 123 | 129 | 290 | 133 | 248 |
| MWD | 15.07 | 19.73 | 19.55 | 16.88 | 46.99 | 73.46 | 13.67 | 14.25 |
| MIE | 0.24 | 0.26 | 0.21 | 0.89 | 0.41 | — | 0.14 | 0.04 |
| SR(F/E) | 137.8 | 37.8 | 95.6 | 31.3 | 83.2 | >1000 | 135.2 | 71.8 |
| density | 0.942 | 0.937 | 0.943 | 0.935 | 0.935 | 0.948 | 0.941 | 0.945 |
| sheet PENT (hrs): 3.6 MPa at 95° | More than 800 | More than 800 | More than 800 | More than 800 | Fracture at 75 | Fracture at 50 | Fracture at 174 | Fracture at 182 |

From the Table 5, the copolymers (Examples 14, 18, 20 and 22) were excellent in long-term physical properties (fracture time) compared to the copolymers (Comparative Example 7). The copolymers (Examples 14, 18, 20 and 22) were obtained by using a bis(isobutylcyclopentadienyl)zirconium dichloride compound having a substituent showing effect of steric hindrance, as the first metallocene compound, while the copolymers (Comparative Example 7) were obtained by using a bis(normalbutylcyclopentadienyl)zirconium dichloride compound having a substituent showing low steric hindrance effect, as the first metallocene compound. Therefore, even though the same second metallocene compound is used, it can be seen that the steric hindrance of substituent of the first metallocene compound influences significantly on the long-term physical properties of the polymer. Namely, it can be seen that as the amount of comonomer in the low molecular weight portion is lowered through the steric hindrance of the first metallocene compound, the long-term physical properties of the copolymer were improved.

Further, the copolymers (Examples 14, 18, 20 and 22) were substantially superior in the long-term physical (fracture time) properties, compared to the copolymers (Comparative Examples 10, 11 and 12). The copolymers (Examples 14, 18, 20 and 22) were obtained by using a 1-(normalbutylcyclopentadienyl)-1-(2,7-di-tert-butylfluorenyl)-1,1-diphenylmethylidene zirconium dichloride compound having a hydrocarbonyl substituent of 4 or more carbon number, as the second metallocene compound, in order to suppress the introduction of LCB, induce only comonomer and improve the polymerization activity, while the copolymers (Comparative Examples 10, 11 and 12) were obtained by using a compound having a hydrocarbonyl substituent of 3 or less carbon number as the second metallocene compound. Also, the long-term physical properties of the copolymers (Comparative Examples 6 and 12) were remarkably reduced. The copolymers (Comparative Examples 6 and 12) were obtained by as the second metallocene compound, using both the hydrocarbonyl substituent of 4 or more carbon number, namely, a compound including a cyclopentadienyl group having a normal-butyl group (n-Bu) and the hydrocarbonyl substituent of 3 or less carbon number, namely, a compound including a cyclopentadienyl group having a methyl group (Me). That is, as shown in Comparative Examples 6 and 12, in case of using the metallocene including a cyclopentadienyl group having a hydrocarbonyl substituent of 3 or less carbon number, the PENT physical properties are lowered. Therefore, in the second metallocene of the present invention, the carbon number of the hydrocarbonyl substituent bonded to cyclopentadienyl group of L4 should be 4 to 10. If the metallocene in which carbon number of the hydrocarbonyl substituent is less 4, is contained, the introduction of LCB cannot be blocked to reduce the PENT physical properties, therefore which is not desirable. In detail, it can be seen that even though the same first metallocene compound are used, the carbon number of the substituent of the second metallocene compound influences on the long-term physical properties of the polymer considerably. Typically, it has been known that when the LCB is introduced to the high molecular weight portion, the long-term physical properties are lowered, and when the comonomer is introduced in the high molecular weight portion, the long-term physical properties are improved owing to SCB entanglement phenomenon, which explains long-term physical property difference between polymers of Examples 14, 18, 20 and 22 and polymers of Comparative Examples 10, 11 and 12. Therefore, it can be confirmed that the metallocene compound having a substituent of 4 or more carbon number can suppress the introduction of LCB and induce only the introduction of the comonomer. In addition, from FIG. 3, FIG. 4 and FIG. 5, it can be confirmed that in the copolymerization prepared according to the present invention, the amount of the comonomer of the high molecular weight portion was relatively high compared to that of the low molecular weight portion.

Figure 6:
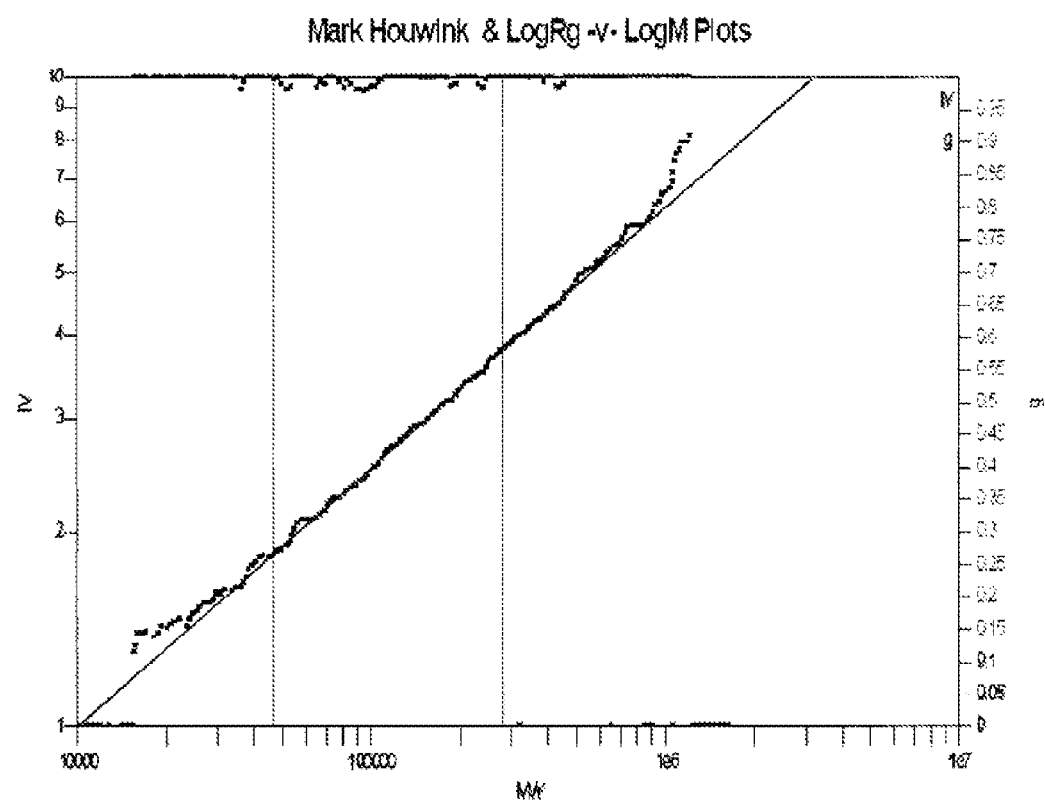
FIG. 6 shows a graph illustrating a relationship between molecular weight and intrinsic viscosity of the copolymer obtained by the Example 18, which is obtained by GPC (Gel Permeation Chromatography).
Figure 7:
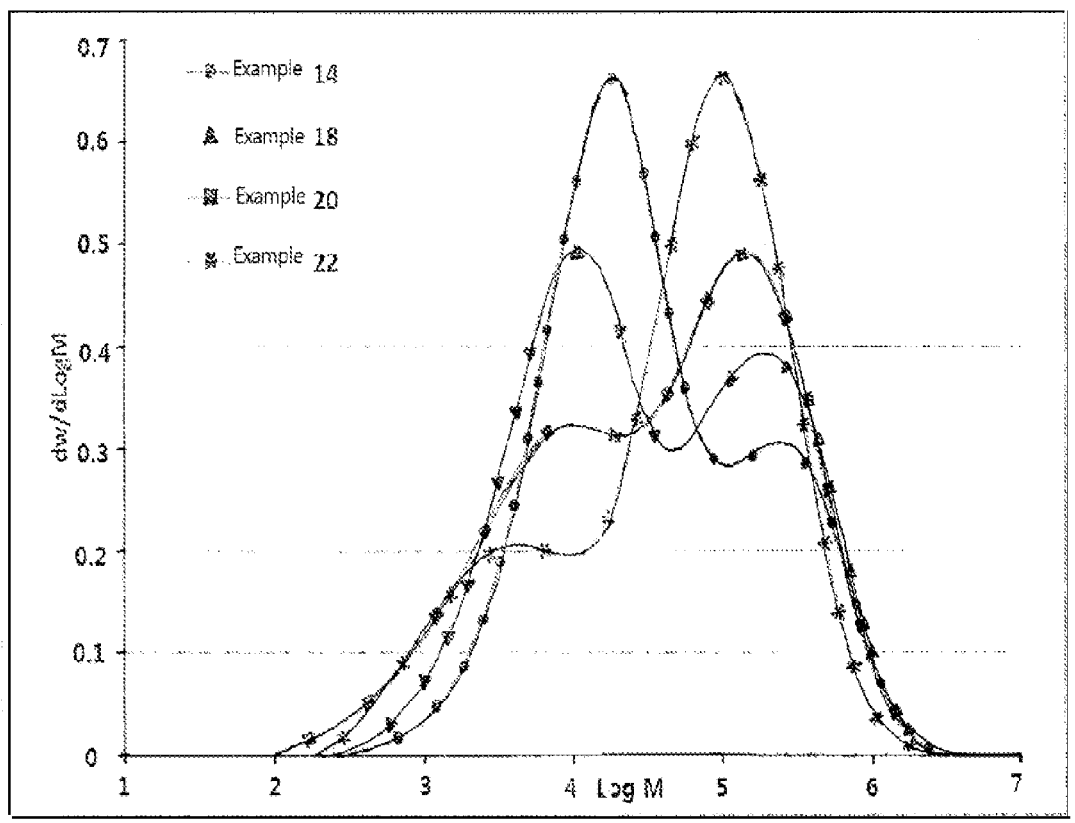
FIG. 7 shows graphs illustrating molecular weight distribution of copolymers obtained by the Examples 14, 18, 20 and 22, which was obtained by GPC.
Figure 8:
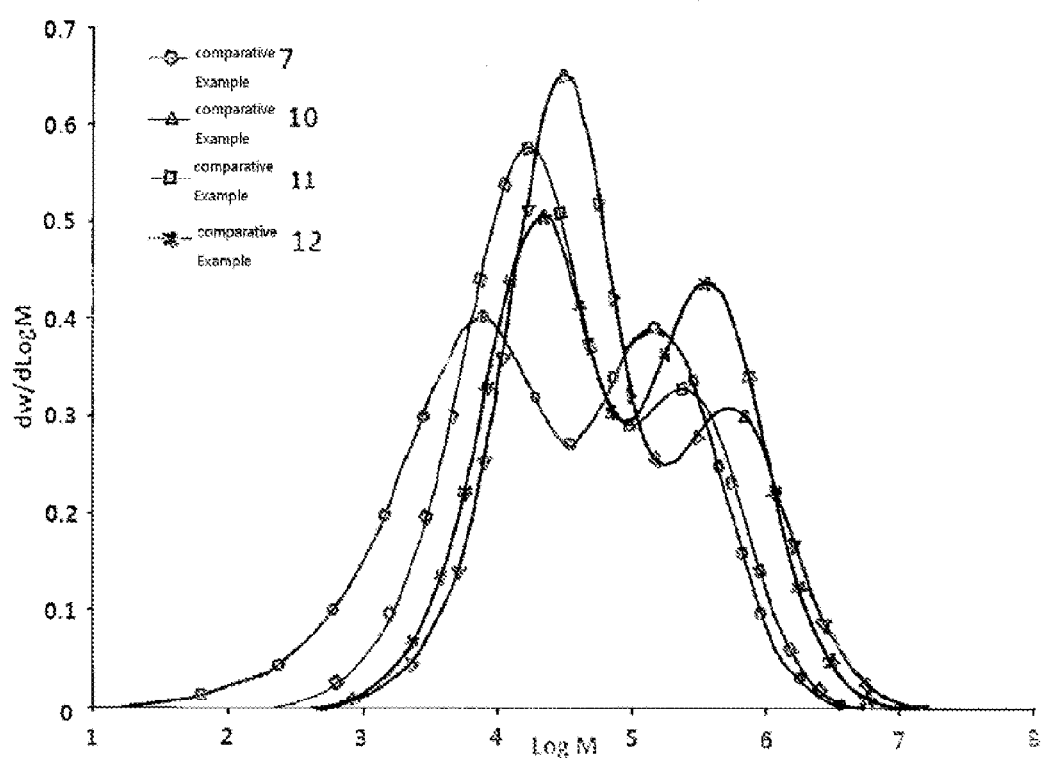
FIG. 8 shows graphs illustrating molecular weight distribution of copolymers obtained by the Comparative Examples 6, 9, 10 and 11, which was obtained by GPC.

Further, with respect to the copolymer obtained from Example 18, the relation of the molecular weight and intrinsic viscosity (IV) measured by GPC was shown in FIG. 6. In FIG. 6, the horizontal axis represents the molecular weight, and the vertical axis represents the intrinsic viscosity. As shown in FIG. 6, in the copolymer polymerized according to the present invention, since the intrinsic viscosity is increased linearly according to an increase of the molecular weight, it can be seen that there is no LCB in the high molecular weight portion. On the other hand, the intrinsic viscosity does not increased linearly but increase logarithmically according to an increase of the molecular weight, it can be judged that the LCB is in the high molecular weight portion. FIG. 7 is a result of GPC analysis (molecular weight distribution) of the copolymers obtained from Examples 14, 18, 20 and 22, and FIG. 8 is a result of GPC analysis (molecular weight distribution) of the copolymers obtained by from Comparative Examples 6, 9, 10 and 11. As can be seen from FIG. 7 and FIG. 8, the all molecular weight distribution of the polymers obtained from Example and Comparative Example of the present invention represents a form of the bimodal, and the form of the bimodal can be changed by changing the ratio of the first metallocene compound.

The invention claimed is:

1. A catalyst composition for preparing a multimodal polyolefin resin, comprising:
   (i) at least one first metallocene compound represented by following Formula 1;
   (ii) at least one second metallocene compound represented by following Formula 2; and
   (iii) at least one co-catalyst selected from aluminoxane groups represented by following Formulas 3, 4 and 5, $(L^1)(L^2)(X^1)(X^2)M^1$            [Formula 1]

in Formula 1, $M^1$ is titanium (Ti), zirconium (Zr) or hafnium (Hf); ($L^1$) and ($L^2$) are independently, a cyclopentadienyl group having an alkyl group of 3 to 10 carbon atoms in which at least one tertiary or quaternary carbon is contained; ($X^1$) and ($X^2$) are independently F, Cl, Br, I or a hydrocarbyl group of 1 to 10 carbon atoms, $(L^3\text{-}Q\text{-}L^4)(X^1)(X^2)M^2$            [Formula 2]

in Formula 2, $M^2$ is Ti, Zr or Hf; ($L^3$) is a fluorenyl group having two alkyl groups of 4 to 10 carbon atoms in which quaternary carbon is contained; ($L^4$) is a cyclopentadienyl group having at least one alkyl group of 4 to 10 carbon atoms; (Q) is a crosslinking functional group represented by Formula $Q^1R^1R^2$, $Q^1$ is carbon atom (C), silicon atom (Si) or germanium atom (Ge), $R^1$ and $R^2$ are independently hydrogen or hydrocarbyl group of 1 to 10 carbon atoms; ($X^1$) and ($X^2$) are independently F, Cl, Br, I or hydrocarbyl group of 1 to 10 carbon atoms,

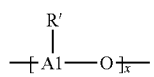
   [Formula 3]

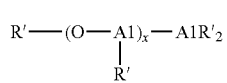
   [Formula 4]

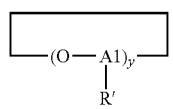
   [Formula 5]

in Formulas 3, 4 and 5, R' is a hydrocarbyl group, x is an integer of 1 to 70 and y is an integer of 3 to 50,
   wherein the amount of the first metallocene compound represented by Formula 1 is 0.25 to 1.50 moles with respect to 1 mole of the second metallocene compound represented by Formula 2.

2. The catalyst composition for preparing a multimodal polyolefin resin according to claim 1, wherein ($L^1$) and ($L^2$) in Formula 1 each is different to each other, and is a cyclopentadienyl group having an alkyl group of 3 to 10 carbon atoms, which contains at least one tertiary or quaternary carbon, but does not contain aryl group.

3. The catalyst composition for preparing a multimodal polyolefin resin according to claim 1, wherein ($L^1$) and ($L^2$) in Formula 1 are the same, and may be a cyclopentadienyl group having an alkyl group of 3 to 10 carbon atoms, which contains at least one tertiary or quaternary carbon, but does not contain aryl group.

4. The catalyst composition for preparing a multimodal polyolefin resin according to claim 1, wherein ($L^4$) in Formula 2 is a cyclopentadienyl group having an alkyl group of 4 to 10 carbon atoms which does not contains an aryl group.

5. The catalyst composition for preparing a multimodal polyolefin resin according to claim 1, wherein ($L^4$) in Formula 2 is a cyclopentadienyl group having an alkyl group of 4 to 7 carbon atoms which does not contains aryl group.

6. The catalyst composition for preparing a multimodal polyolefin resin according to claim 1, wherein $R^1$ and $R^2$ in Formula 2 are the same to each other and are aryl group of 6 to 10 carbon atoms.

7. The catalyst composition for preparing a multimodal polyolefin resin according to claim 1, wherein the first metallocene compound represented by the Formula 1 is a compound represented by following Formula 1m,

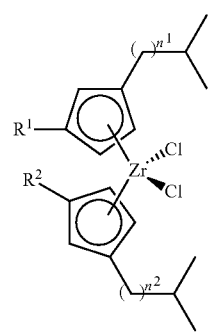
[Formula 1m]

in formula 1m, $R^1$ and $R^2$ are independently hydrogen atom or methyl group, and $n^1$ and $n^2$ are independently an integer of 1 to 3.

8. The catalyst composition for preparing a multimodal polyolefin resin according to claim 1, wherein the first metallocene compound represented by the Formula 1 is a compound represented by following Formula 1n,

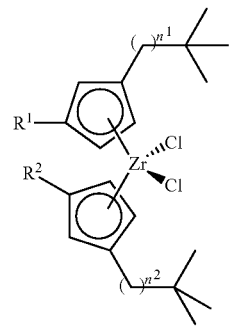
[Formula 1n]

in formula 1n, $R^1$ and $R^2$ are independently hydrogen atom or methyl group, and $n^1$ and $n^2$ are independently an integer of 1 to 3.

9. The catalyst composition for preparing a multimodal polyolefin resin according to claim 1, wherein the second metallocene compound represented by the Formula 2 is a compound represented by following Formula 2d,

[Formula 2d]

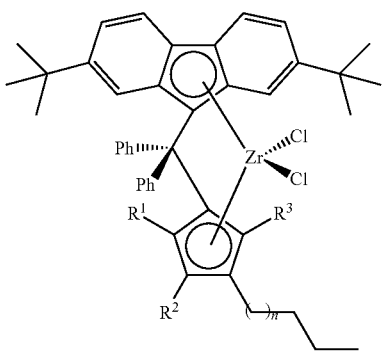

in formula 2d, $R^1$, $R^2$ and $R^3$ are independently hydrogen atom or methyl group, and n is independently an integer of 1 to 3.

10. The catalyst composition for preparing a multimodal polyolefin resin according to claim 1, wherein the amount of aluminum of the aluminoxane is 1 to 100,000 moles with respect to 1 mole of sum of the first metallocene compound of Formula 1 and the second metallocene compound of Formula 2.

11. The catalyst composition for preparing a multimodal polyolefin resin according to claim 1, wherein the first and second metallocene compound and the aluminoxane are supported by an organic or inorganic carrier.

12. The catalyst composition for preparing a multimodal polyolefin resin according to claim 11, wherein the amount of aluminum in the catalyst composition is 5 to 30 weight part with respect to 100 weight part of the carrier, and the carrier amount of the transition metal compound in the catalyst composition is 0.01 to 2 weight part with respect to 100 weight part of the carrier.

13. A method for polymerizing polyolefin comprising a step of polymerizing olefin monomer in the presence of a catalyst composition comprising (i) at least one first metallocene compound represented by following Formula 1; (ii) at least one second metallocene compound represented by following Formula 2; and (iii) at least one co-catalyst selected from aluminoxane groups represented by following Formulas 3, 4 and 5, $(L^1)(L^2)(X^1)(X^2)M^1$ [Formula 1]

in Formula 1, $M^1$ is titanium (Ti), zirconium (Zr) or hafnium (Hf); ($L^1$) and ($L^2$) are independently, a cyclopentadienyl group having an alkyl group of 3 to 10 carbon atoms in which at least one tertiary or quaternary carbon is contained; ($X^1$) and ($X^2$) are independently F, Cl, Br, I or a hydrocarbyl group of 1 to 10 carbon atoms, $(L^3\text{-}Q\text{-}L^4)(X^1)(X^2)M^2$ [Formula 2]

in Formula 2, $M^2$ is Ti, Zr or Hf; ($L^3$) is a fluorenyl group having two alkyl groups of 4 to 10 carbon atoms in which quaternary carbon is contained; ($L^4$) is a cyclopentadienyl group having at least one alkyl group of 4 to 10 carbon atoms; (Q) is a crosslinking functional group represented by Formula $Q^1R^1R^2$, $Q^1$ is carbon atom (C), silicon atom (Si) or germanium atom (Ge), $R^1$ and $R^2$ are independently hydrogen or alkyl group of 1 to 10 carbon atoms; ($X^1$) and ($X^2$) are independently F, Cl, Br, I or hydrocarbyl group of 1 to 10 carbon atoms, $$-(\!\!\operatorname*{Al}_{\underset{R'}{|}}\!\!-O)_{x}-$$ [Formula 3]

$$R'-(O-Al)_x-AlR'_2 \\ \phantom{R'-(O-}\underset{R'}{|}$$ [Formula 4]

$$-(O-Al)_y- \\ \phantom{-(O-}\underset{R'}{|}$$ [Formula 5]

in Formulas 3, 4 and 5, $R^1$ is a hydrocarbyl group, x is an integer of 1 to 70 and y is an integer of 3 to 50, and wherein the amount of the first metallocene compound represented by Formula 1 is 0.25 to 1.50 moles with respect to 1 mole of the second metallocene compound represented by Formula 2.

* * * * *

UNITED STATES PATENT AND TRADEMARK OFFICE
CERTIFICATE OF CORRECTION

PATENT NO.         : 9,487,607 B2                   Page 1 of 1
APPLICATION NO.    : 14/648795
DATED              : November 8, 2016
INVENTOR(S)        : Byung-Keel Sohn et al.

It is certified that error appears in the above-identified patent and that said Letters Patent is hereby corrected as shown below:

In the Claims

Claim 13, Column 32, Line 37, between "Formulas 3,4, and 5" and "is a hydrocarbyl group", please replace "$R^1$" with "R"

Signed and Sealed this
Seventeenth Day of January, 2017

Michelle K. Lee
*Director of the United States Patent and Trademark Office*